US012060853B2

(12) United States Patent
Elzein et al.

(10) Patent No.: US 12,060,853 B2
(45) Date of Patent: Aug. 13, 2024

(54) ROCKET ENGINE WITH INTEGRATED OXIDIZER CATALYST IN MANIFOLD AND INJECTOR ASSEMBLY

(71) Applicant: LABORATOIRE REACTION DYNAMICS INC., Saint-Jean-sur-Richelieu (CA)

(72) Inventors: Bachar Elzein, Montréal (CA); Maxime Goulet-Bourdon, Montréal (CA); Miguel Gagnon, Montréal (CA)

(73) Assignee: LABORATOIRE REACTION DYNAMICS INC., Saint-Jean-sur-Richelieu (CA)

( * ) Notice: Subject to any disclaimer, the term of this patent is extended or adjusted under 35 U.S.C. 154(b) by 0 days.

(21) Appl. No.: 16/698,209

(22) Filed: Nov. 27, 2019

(65) Prior Publication Data

US 2021/0148307 A1   May 20, 2021

Related U.S. Application Data

(60) Provisional application No. 62/798,679, filed on Jan. 30, 2019.

(51) Int. Cl.
*F02K 9/72*     (2006.01)
*B64G 1/40*    (2006.01)
(Continued)

(52) U.S. Cl.
CPC .............. *F02K 9/72* (2013.01); *B64G 1/404* (2013.01); *F02K 9/10* (2013.01); *F02K 9/28* (2013.01);
(Continued)

(58) Field of Classification Search
CPC ..... F02K 9/62; F02K 9/68; F02K 9/72; B64G 1/404
See application file for complete search history.

(56) References Cited

U.S. PATENT DOCUMENTS 3,091,520 A * 5/1963 Newburn .................. F02K 9/68
422/220
3,132,476 A   5/1964 Conrad
(Continued)

FOREIGN PATENT DOCUMENTS

CN    207278380 U    4/2018
WO    2001038711 A1  5/2001
(Continued)

OTHER PUBLICATIONS

Pfeil, M. A., Kulkarni, A. S., Ramachandran, P. V., Son, S. F., & Heister, S. D. (2015). Solid Amine-Boranes as High-Performance and Hypergolic Hybrid Rocket Fuels. Journal of Propulsion and Power, 32(1), 23-31.
(Continued)

*Primary Examiner* — Kyle Robert Thomas
(74) *Attorney, Agent, or Firm* — NORTON ROSE FULBRIGHT CANADA LLP

(57) ABSTRACT

A rocket engine has: a combustion chamber having a chamber inlet for receiving an oxidizer and a chamber outlet for expelling combustion gases in an environment outside the combustion chamber; a manifold having a manifold inlet fluidly connectable to a source of the oxidizer and a manifold outlet; a catalyst having a catalyst inlet fluidly connected to the manifold outlet and a catalyst outlet; and an injector plate having a injector inlet fluidly connected to the catalyst outlet and an injector outlet fluidly connected to the chamber inlet.

13 Claims, 10 Drawing Sheets

(51) Int. Cl.
*F02K 9/10* (2006.01)
*F02K 9/28* (2006.01)
*F02K 9/52* (2006.01)
*F02K 9/62* (2006.01)
*F02K 9/82* (2006.01)
*F02K 9/97* (2006.01)

(52) U.S. Cl.
CPC .................. *F02K 9/52* (2013.01); *F02K 9/62* (2013.01); *F02K 9/82* (2013.01); *F02K 9/972* (2013.01); *F05D 2230/30* (2013.01); *F05D 2300/11* (2013.01); *F05D 2300/132* (2013.01); *F05D 2300/177* (2013.01)

(56) References Cited

U.S. PATENT DOCUMENTS

| | | |
|---|---|---|
| 3,135,703 A | 6/1964 | Sill |
| 3,158,997 A * | 12/1964 | Blackman ................ F02K 9/72 60/39.47 |
| 3,166,897 A | 1/1965 | Lawrence et al. |
| 3,177,657 A | 4/1965 | Strauss |
| 3,204,405 A | 9/1965 | Warren |
| 3,300,978 A | 1/1967 | Pennington |
| 3,315,472 A | 4/1967 | Andre |
| 3,334,489 A | 8/1967 | Andre |
| 3,368,353 A | 2/1968 | Allport |
| 3,378,204 A | 4/1968 | Chase |
| 3,443,384 A | 5/1969 | Webb |
| 3,446,023 A | 5/1969 | Mosier |
| 3,447,316 A * | 6/1969 | White ...................... F02K 9/68 422/218 |
| 3,581,504 A * | 6/1971 | Andrus .................... F02K 9/48 60/259 |
| 3,584,461 A * | 6/1971 | Debize .................... F02K 9/72 60/251 |
| 3,608,833 A | 9/1971 | Hankins et al. |
| 3,618,324 A * | 11/1971 | Munding ................ C06D 5/00 60/258 |
| 3,640,072 A | 2/1972 | Kayser |
| 3,695,041 A | 10/1972 | Eggers |
| 3,702,174 A * | 11/1972 | Hankins ................... F02K 9/52 239/265.11 |
| 3,712,059 A | 1/1973 | Drexhage |
| 3,759,039 A | 9/1973 | Williams |
| 3,768,253 A | 10/1973 | Drawbaugh |
| 3,768,256 A | 10/1973 | Butter et al. |
| 3,773,462 A | 11/1973 | Waeselynck |
| 3,792,669 A * | 2/1974 | Ueno ..................... F23G 7/12 60/39.822 |
| 3,956,885 A | 5/1976 | Davis |
| 4,628,688 A | 12/1986 | Keirsey |
| 4,811,556 A | 3/1989 | Lau |
| 4,817,890 A | 4/1989 | Coffinberry |
| 4,835,959 A * | 6/1989 | Coffinberry ............... F02K 7/18 60/253 |
| 4,840,025 A | 6/1989 | Coffinberry |
| 4,841,723 A | 6/1989 | Lau |
| 5,101,623 A | 4/1992 | Briley |
| 5,367,872 A | 11/1994 | Lund |
| 5,372,070 A | 12/1994 | Neidert |
| 5,404,715 A | 4/1995 | Vuillamy |
| 5,622,046 A | 4/1997 | Michaels |
| 5,715,675 A | 2/1998 | Smith |
| 5,718,113 A | 2/1998 | Hayes |
| 6,085,516 A | 7/2000 | Smith |
| 6,101,808 A | 8/2000 | Knuth |
| 6,125,763 A | 10/2000 | Kline et al. |
| 6,298,659 B1 | 10/2001 | Knuth |
| 6,354,074 B1 | 3/2002 | Jones |
| 6,446,427 B1 | 9/2002 | Yu et al. |
| 6,467,253 B1 * | 10/2002 | Haggander ............. F02K 9/972 165/169 |
| 6,590,403 B1 | 7/2003 | Gramer |
| 6,601,380 B2 | 8/2003 | Knuth |
| 6,684,624 B2 | 2/2004 | Karabeyoglu et al. |
| 6,860,099 B1 | 3/2005 | Xenofos et al. |
| 6,865,878 B2 * | 3/2005 | Knuth ..................... F02K 9/64 60/258 |
| 7,770,380 B2 | 8/2010 | Dulligan |
| 8,020,614 B2 * | 9/2011 | Hobson, III ........... F02M 25/10 166/64 |
| 8,387,361 B2 | 3/2013 | Ho |
| 9,038,368 B2 | 5/2015 | Fuller |
| 9,458,796 B2 | 10/2016 | Chen |
| 2002/0069636 A1 | 6/2002 | Knuth |
| 2002/0078680 A1 | 6/2002 | Jones et al. |
| 2004/0068976 A1 | 4/2004 | Knuth |
| 2005/0241294 A1 | 11/2005 | Cesaroni |
| 2008/0056961 A1 | 3/2008 | Matveev |
| 2009/0211227 A1 | 8/2009 | Loehr |
| 2009/0235636 A1 | 9/2009 | Oehrlein |
| 2011/0167793 A1 * | 7/2011 | Kwon ...................... F02K 9/72 60/251 |
| 2012/0060464 A1 | 3/2012 | Grote |
| 2012/0144797 A1 | 6/2012 | Dobek |
| 2013/0031888 A1 | 2/2013 | Fuller |
| 2013/0042596 A1 | 2/2013 | Fuller |
| 2014/0260305 A1 | 9/2014 | Hobbs |
| 2014/0352276 A1 | 12/2014 | Chen |
| 2015/0128597 A1 * | 5/2015 | Schlak .................... F03D 13/20 60/719 |
| 2015/0251766 A1 * | 9/2015 | Atkey ................... F25B 31/026 244/13 |
| 2015/0330869 A1 * | 11/2015 | Ziarno ................. G07C 5/0841 701/34.4 |
| 2015/0369175 A1 | 12/2015 | Berdoyes et al. |
| 2016/0076461 A1 * | 3/2016 | Kawai .................... B64D 37/30 60/772 |
| 2018/0087443 A1 | 3/2018 | Adriany et al. |
| 2018/0128207 A1 | 5/2018 | Villarreal |
| 2018/0156159 A1 | 6/2018 | Adriany |
| 2018/0245543 A1 | 8/2018 | Engelhardt |
| 2018/0334996 A1 * | 11/2018 | Chew ...................... F02K 9/28 |
| 2020/0116106 A1 | 4/2020 | Chiaverini |

FOREIGN PATENT DOCUMENTS

| | | |
|---|---|---|
| WO | 2007065220 A1 | 6/2007 |
| WO | 2008082677 A2 | 7/2008 |

OTHER PUBLICATIONS

Oishige, Y., Hayashi, D., & Sakurai, T. (2016). Fuel Regression Behavior of a Swirling-Injection End-Burning Hybrid Rocket Engine using Paraffin-based Fuels. In 52nd AIAA/SAE/ASEE Joint Propulsion Conference (p. 4755).

International Search Report and Written Opinion, PCT/CA2020/050110, May 12, 2020.

Lengelle et al, "Interest of Hybrid Propulsion for Missile Applications", Nato Unclassified, Paper presented at the RTO AVT Specialists' Meeting on "Advances in Rocket Performance Life and Disposal", held in Aalborg, Denmark, Sep. 23-26, 2002, and published in RTO-MP-091.

Schmierer et al, "Advancing Europe's Hybrid Rocket Engine Technology with Paraffin and LOX", 8th European Conference for Aeronautics and Aerospace Sciences (EUCASS), DOI: 10.13009/EUCASS2019-682, 2019.

Cantwell, "Similarity Solution of Fuel Mass Transfer, Port Mass Flux Coupling in Hybrid Propulsion", Department of Aeronautics and Astronautics, Stanford University, Journal of Engineering Mathematics (ISSN 0022-0833) (2014) 84:19-40, http://link.springer.com/content/pdf/10.1007/s10665-013-9624-y.pdf#page-1.

Bath, "Performance Characterization of Complex Fuel Port Geometries for Hybrid Rocket Fuel Grains", Utah State University, DigitalCommons@USU, Dec. 2012.

Zandbergen, "Some Typical Solid Propellant Rocket Motors", Delft University of Technology, Faculty of Aerospace Engineering, Memorandum M-712 (Version 2.0), Dec. 2013.

(56) References Cited

OTHER PUBLICATIONS

Walker, "High Regression Rate Hybrid Rocket Fuel Grains with Helical Port Structures", Utah State University, DigitalCommons@USU, May 2015.

Saito, "Investigation of Axial-Injection End-Burning Hybrid Rocket Motor Regression", Advances in Aircraft and Spacecraft Science, vol. 4, No. 3 (2017) 281-296, DOI: http://dx.doi.org/10.12989/aas.2017.4.3.281.

Kobald, "Viscosity and Regression Rate of Liquefying Hybrid Rocket Fuels", Journal of Propulsion and Power, vol. 33, No. 5, Sep.-Oct. 2017, DOI: 10.2514/1.B36207.

* cited by examiner

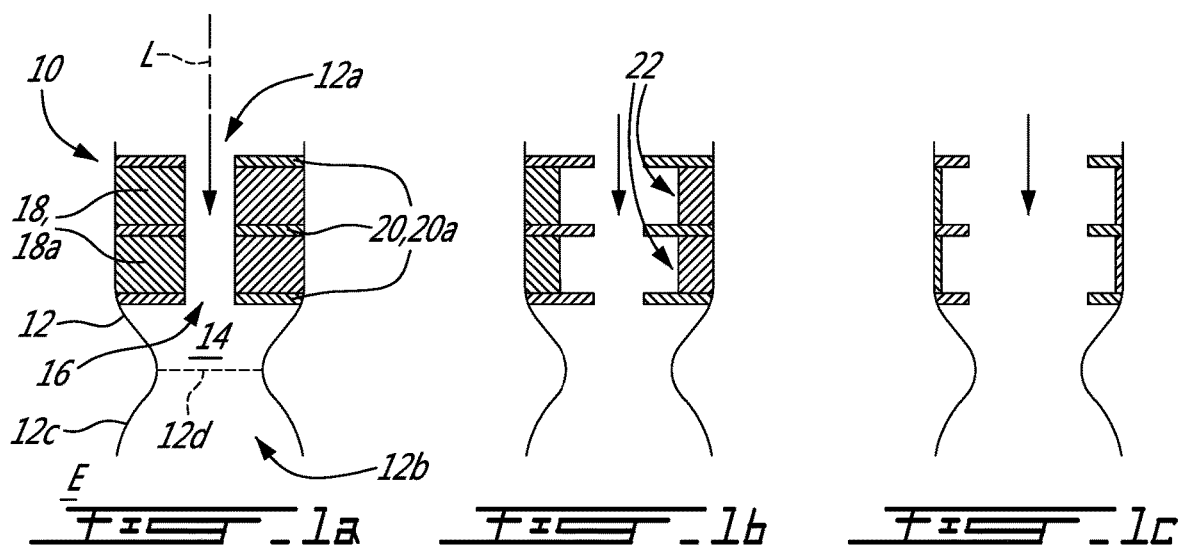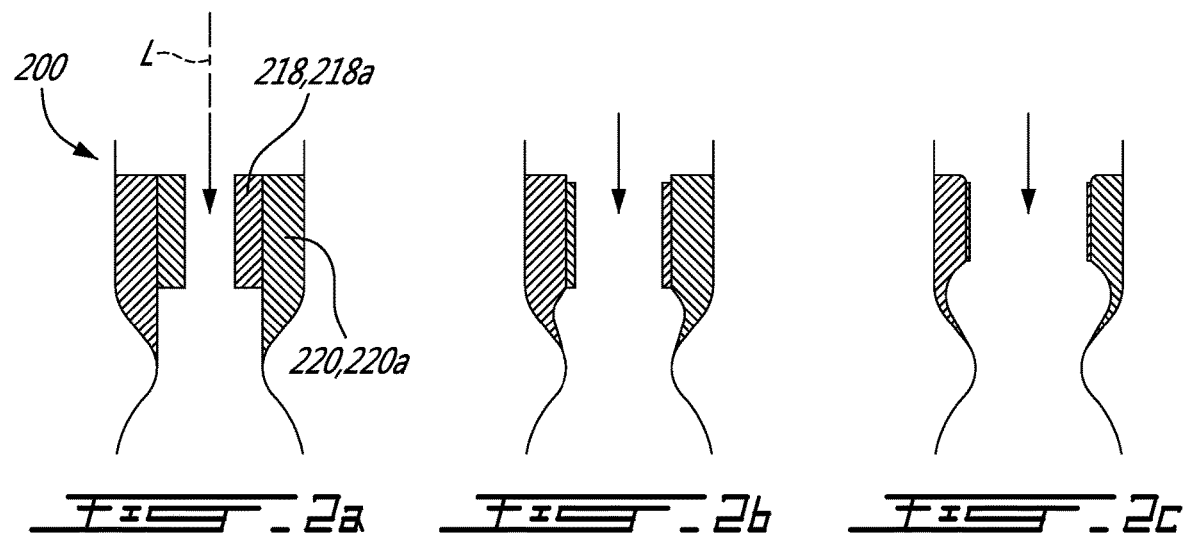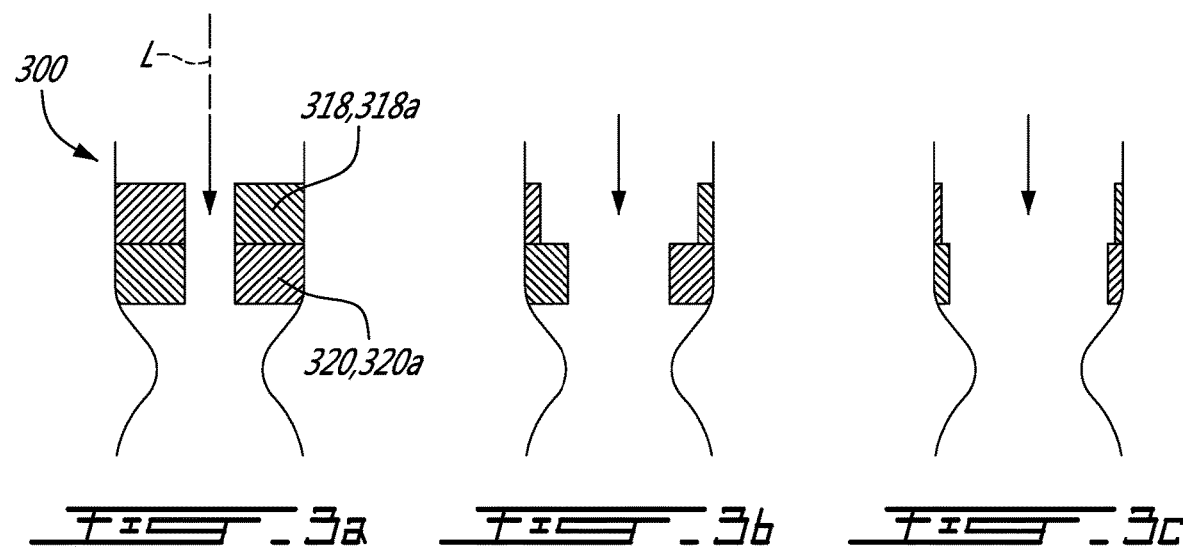

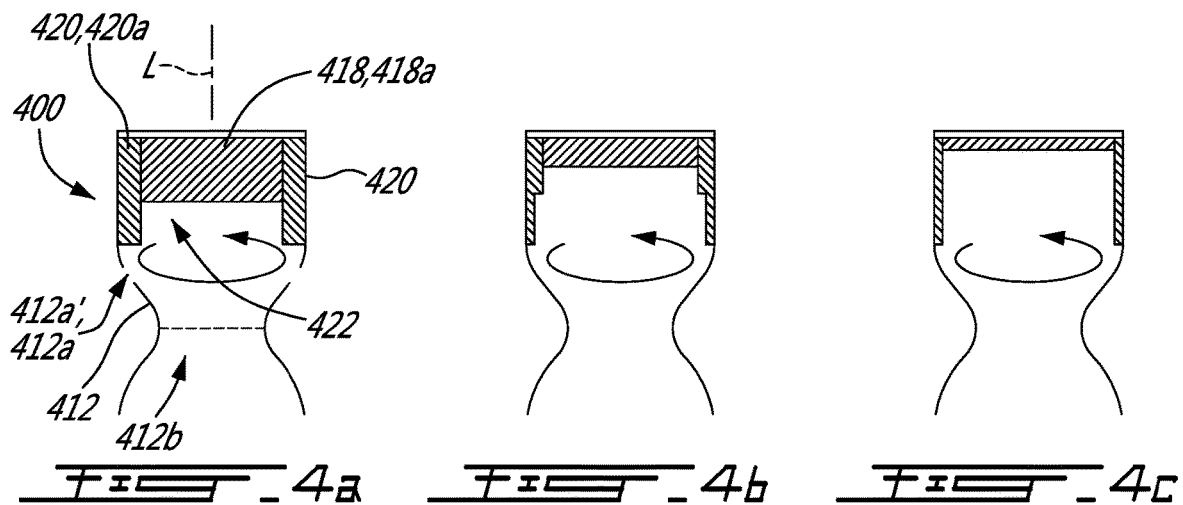
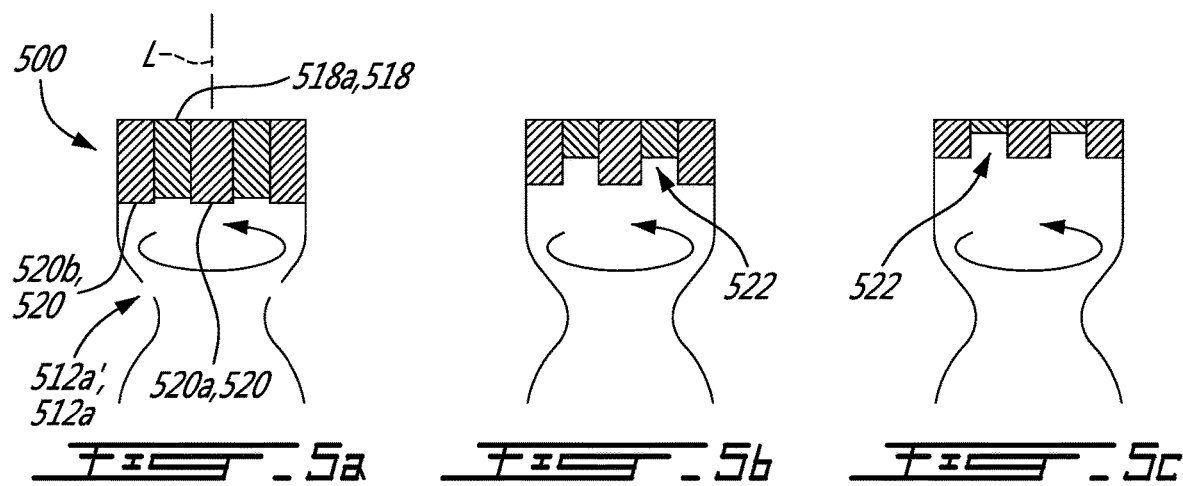
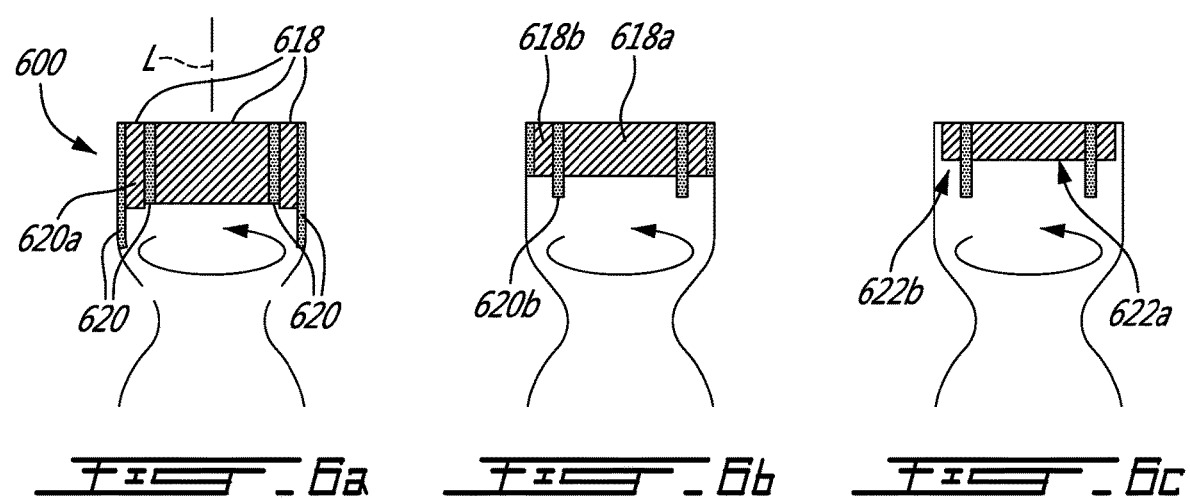

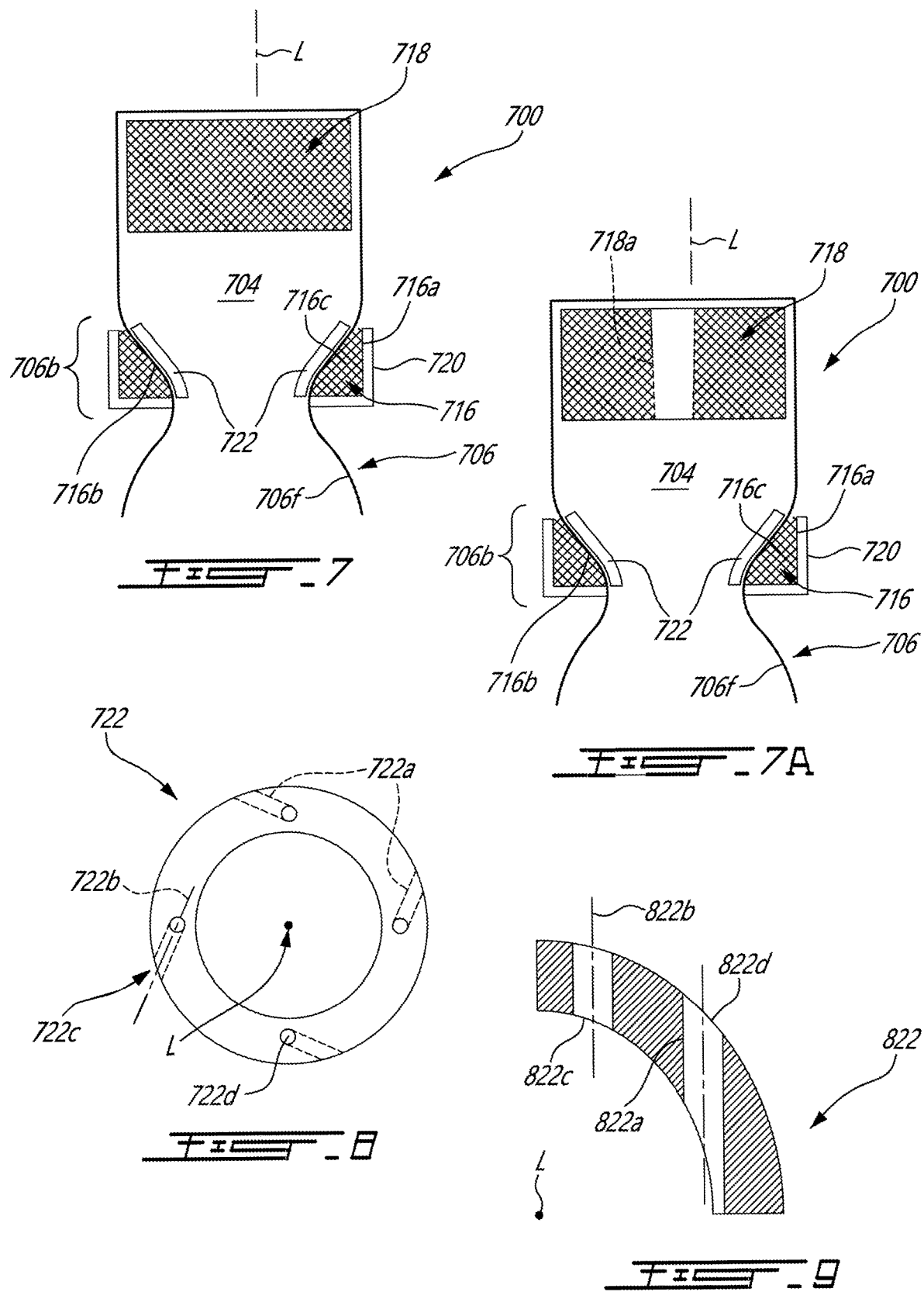

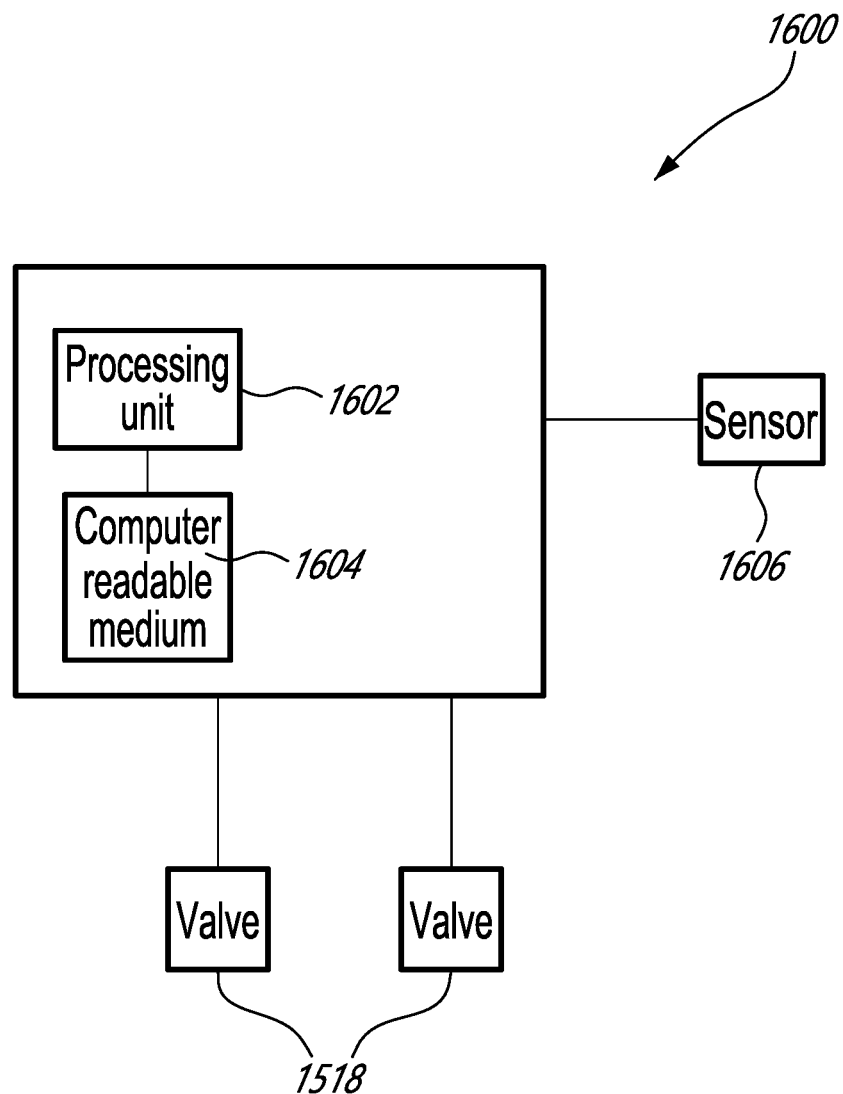

ROCKET ENGINE WITH INTEGRATED OXIDIZER CATALYST IN MANIFOLD AND INJECTOR ASSEMBLY

CROSS-REFERENCE TO RELATED APPLICATIONS

This application claims priority from U.S. provisional application No. 62/798,679 filed Jan. 30, 2019, the entire contents of which are incorporated by reference herein.

TECHNICAL FIELD

The application relates generally to rocket engines and, more particularly, to hybrid propellant rocket engine configurations.

BACKGROUND OF THE ART

The development of new high-performance fuel/oxidizer combinations for rocket propulsion applications must take into consideration several important parameters such as the propellants specific impulse, storability, ignition delay, stability and toxicity. Hybrid rocket propellants have the potential to address some of the drawbacks of liquid alternatives, mainly because of their relative simplicity, low development cost, the ability to control their thrust and re-ignite them following partial burns, and because it may alleviate the requirement to match the momenta of the dual propellant streams during throttling operation.

Standard hybrid rocket engines have not yet found commercial spaceflight applications because they suffer from slow solid-fuel regression rates, low volumetric loading and relatively poor combustion efficiency, compared to existing alternatives. This may be due to their inability to burn at a constant oxidizer to fuel ratio, which may result in poor average combustion performance. This oxidizer to fuel ratio shift throughout the duration of the burn, meaning that the rocket engine's specific impulse cannot be maintained at its peak value, since the fuel is not burning at its optimal stoichiometric ratio.

There are currently four common ways of powering injection of propellant into a combustion chamber of a rocket engine. These four injection ways are divided into two main categories. The first category includes pressure-fed power cycle, which demonstrated the most potential for hybrid rocket propulsion systems, as it is the one with the least component complexity and moving parts. The second category, which encompasses the other three cycles (staged combustion, expanders and gas-generator cycles) and their derivatives, all rely on turbo-pumps to inject propellants into the combustion chamber. Turbo-pumps increase complexity since they require gas-generators which incorporate their own injector set, regulators and so on.

Propulsion systems using pressure-fed cycles have practical limits on propellant pressure, which in turn limits combustion chamber pressure, thus minimizing performance. High pressure propellant tanks require thicker walls and stronger alloys which makes the vehicle tanks heavier, reducing performance and payload capacity.

SUMMARY

The disclosed thrust chamber assembly combined with the disclosed high volumetric specific impulse solid polymer fuel may enable constant oxidizer to fuel ratio, maintain high combustion performance, and high ideal characteristic velocity. The solid polymer fuel within the thrust chamber assembly incorporates means and methods to control its droplets vaporization mechanism through a change of its thermorheological properties, which may result in a constant fuel mass flow release. Those thermorheological properties may be tailored to ensure a near stoichiometric combustion performance through the duration of the rocket engine's operations, which may yield an overall high specific impulse with enough margins to enable orbital flight.

The combustion process of liquefying solid polymer fuels may involve sequential vaporization and combustion of droplets vapors in the gas phase. The rate at which liquid fuel droplets vaporize and combust is dependent on thermorheological properties of the fuel, most notably the droplet sizes and the rates at which heat can be transferred to the liquid fuel droplet surfaces and the mixing characteristics in the combustion chamber. Layer by layer, the solid fuel is vaporized, and the liquid fuel droplets are then consumed. Even for smaller droplets, the phenomena are the same, but at a much faster rate with good mixing.

The disclosed high volumetric specific impulse solid polymer fuels may drastically reduce the mechanical complexity of the propulsion systems. Additionally, the complexity of the system is largely determined by the type of power cycle used for the rocket propulsion system.

The high volumetric specific impulse of the fuel may allow for a major volume reduction of the oxidizer tank and the combustion chamber thus increasing the vehicle' structural margins, which may increase stage mass ratio. This increase of stage mass ratio may compensate for the mass losses that may be required for pressure-fed pressuring gas contained within a tank. The disclosed propellants demonstrated hypergolic characteristics with various oxidizers may give mission planners more flexibility with mission flight paths designs and gives vehicle designers more options for future vehicle developments with enhanced capabilities.

The use of fuels with high volumetric specific impulse may allow a major volume reduction of the oxidizer tank and the combustion chamber thus increasing the vehicle's structural margins, increasing the launch vehicle's payload mass. This may allow for a reduction of structure mass due to lower pressure needs and for a reduction of propellant mass due to higher volumetric specific impulse.

The present disclosure provides a thrust chamber assembly incorporating a solid polymer fuel having a mass flow that may be unaffected by the variation of the oxidizer's flux for the full duration of the rocket engine burn, as the fuel's thermorheological properties may be controlled throughout a length of the latter as a consequence of different processes that can involve microcrystalline structure, chemical additives, and others, or a combination of the said processes. As a result, the high volumetric specific impulse solid polymer fuels may drastically reduce the mechanical complexity of the propulsion systems, which is an inherent problem for any orbital vehicle.

The disclosed rocket engine might drastically reduce the mechanical complexity of propulsion systems, which is an inherent problem for any orbital vehicle. The mechanical complexity is largely determined by the type of power cycle used for the rocket propulsion system.

In one aspect, there is provided a rocket engine comprising: a housing having a longitudinal axis and defining a combustion chamber, the housing defining an inlet and an outlet of the combustion chamber, a flow passage extending from the inlet to the outlet within the housing, the inlet fluidly connectable to a source of oxidizer, the outlet opening to an environment outside the combustion chamber for expelling combustion gases, a first fuel having of a first solid propellant and a second fuel having of a second solid propellant, the first and second fuels located within the combustion chamber, the first solid propellant having a regression rate greater than that of the second solid propellant.

The first and second fuels are axially offset from one another relative to the longitudinal axis. Each of the first and second fuels may include at least one annular disk. The second fuel may include three annular disks of the second solid propellant and the first fuel may include two annular disks of the first solid propellant, each of the two annular disks of the first solid propellant may be sandwiched between two of the three annular disks of the second solid propellant. The first and second fuels may be radially offset from one another relative to a longitudinal axis of the housing. The first fuel may be located radially inwardly to the second fuel relative to the longitudinal axis. The first fuel may be a tube. The inlet may include at least one aperture defined through the housing, the at least one aperture may be located axially between the first and second fuels and the outlet relative to a longitudinal axis of the housing. The first and second fuels may be located axially between the inlet and the outlet of the combustion chamber. A third fuel may be located within the combustion chamber, the third fuel may have a third solid propellant having a regression rate different that those of the first and second solid propellants.

In another aspect, there is provided a method of operating a rocket engine, comprising: receiving an oxidizer within a combustion chamber; exposing first and second fuels to the received oxidizer, the first fuel having a first solid propellant, the second fuel having a second solid propellant having a higher viscosity than that of the first solid propellant; and expelling combustion gasses created by a reaction between the received oxidizer and the first and second fuels.

Receiving the oxidizer may include receiving the oxidizer along an axial direction relative to a longitudinal axis of the rocket engine. Receiving the oxidizer may include receiving the oxidizer via an inlet. Expelling the combustion gasses may include expelling the combustion gasses via an outlet, the first and second fuels may be located axially between the inlet and the outlet relative to a longitudinal axis of the rocket engine. Receiving the oxidizer may include receiving the oxidizer in a direction having a radial component relative to a longitudinal axis of the rocket engine. Receiving the oxidizer in the direction having the radial component may further comprise receiving the oxidiser in the direction further having a circumferential component relative to the longitudinal axis.

In another aspect, there is provided a rocket engine having a combustion chamber with at least two kinds of solid fuels that differ by their rheological properties. This may allow to yield an optimal oxidizer to fuel ratio during the total duration of the burn and may thus allow to achieve ideal characteristic velocity. Having two fuels with different viscosities may offer the ability to alter the shape of the fuel stacking during the combustion phase to obtain some cooling characteristics. The disclosed rocket engine has a thrust chamber assembly, also referred to as the combustion chamber, incorporating a stacking of several solid fuels with the fuel's mass flow that may be unaffected by the variation of the oxidizer's flux throughout the duration of the burn, as the fuel's viscosity may be varied between the different stacking.

Effectively guiding a rocket launch vehicle to its intended orbit requires precise guidance and control and the control of the direction of exhaust from the vehicle's rocket engine (referred to as Thrust Vector Control or TVC) is important to achieving this control. One method to control the direction of exhaust gases is through the precise injection of a fluid (gas or liquid) into the expansion section of the rocket nozzle.

To achieve this thrust vectoring effect with higher reliability, and to enable assembly and manufacturing costs of individual engines, there is disclosed herein a concept for embedded injection ports which may integrate directly into the sides of the expansion section of the rocket nozzles. The part may be manufactured using fused metal deposition manufacturing and will have an injector apertures to inject a working fluid into the exhaust gases, a port to accept a standardized valve, and a shape allowing it to be easily integrated into the side of the nozzle. Since the part may be add 3D printed, it may match the complex curvature of the nozzle and holes drilled in the nozzle to accept the part. As well, the part may use features which may facilitate bonding and laminating to the ablative liner of the surface, which may allow for a better and stronger seal to be made with the nozzle extension. The integrated and monolithic nature of the part may allow for the thrust vector control plumbing to be quickly assembled with the engine.

In one aspect, there is provided a rocket engine comprising: a combustion chamber having a chamber inlet for receiving an oxidizer and a chamber outlet for expelling combustion gases in an environment outside the combustion chamber; a manifold having a manifold inlet fluidly connectable to a source of the oxidizer and a manifold outlet; a catalyst having a catalyst inlet fluidly connected to the manifold outlet and a catalyst outlet; and an injector plate having a injector inlet fluidly connected to the catalyst outlet and an injector outlet fluidly connected to the chamber inlet.

In another aspect, there is provided an integrated injector assembly for injecting an oxidizer within a combustion chamber of a rocket engine, comprising an inner wall defining an inlet fluidly connectable to a source of an oxidizer, an outer wall spaced apart from the inner wall to define a cavity therebetween, the outer wall defining an outlet for injecting a catalyzed oxidizer within the combustion chamber, and a catalyst located within the cavity.

In yet another aspect, there is provided a method of supplying an oxidizer within a combustion chamber of a rocket engine, comprising: receiving an oxidizer; distributing the received oxidizer while catalyzing the received oxidizer; and injecting the catalyzed oxidizer within the combustion chamber.

DESCRIPTION OF THE DRAWINGS

Reference is now made to the accompanying figures in which:

FIGS. 1a to 1c are schematic cross-sectional views of a rocket engine in accordance with one embodiment taken at different time steps (1a: t=0; 1b: t=t1; 1c: t=t1+Δt);

FIGS. 2a to 2c are schematic cross-sectional views of a rocket engine in accordance with another embodiment taken at different time steps (2a: t=0; 2b: t=t1; 2c: t=t1+Δt);

FIGS. 3a to 3c are schematic cross-sectional views of a rocket engine in accordance with another embodiment taken at different time steps (3a: t=0; 3b: t=t1; 3c: t=t1+Δt);

FIGS. 4a to 4c are schematic cross-sectional views of a rocket engine in accordance with another embodiment taken at different time steps (4a: t=0; 4b: t=t1; 4c: t=t1+Δt);

FIGS. 5a to 5c are schematic cross-sectional views of a rocket engine in accordance with another embodiment taken at different time steps (5a: t=0; 5b: t=t1; 5c: t=t1+Δt);

FIGS. 6a to 6c are schematic cross-sectional views of a rocket engine in accordance with another embodiment taken at different time steps (6a: t=0; 6b: t=t1; 6c: t=t1+Δt)

FIG. 7 is a schematic cross-sectional view of a rocket engine in accordance with another embodiment;

FIG. 7A is a schematic cross-sectional view of a rocket engine in accordance with another embodiment.

FIG. 8 is a schematic top partially transparent view of an injector plate of the rocket engine of FIG. 7;

FIG. 9 is a schematic fragmented cross-sectional view, taken on a plane containing a longitudinal axis of the rocket engine of FIG. 7, and illustrating an injector plate in accordance with another embodiment that may be used with the rocket engine of FIG. 7;

FIG. 19 is a schematic view of a control system for a rocket engine system.

DETAILED DESCRIPTION

Figure 1:
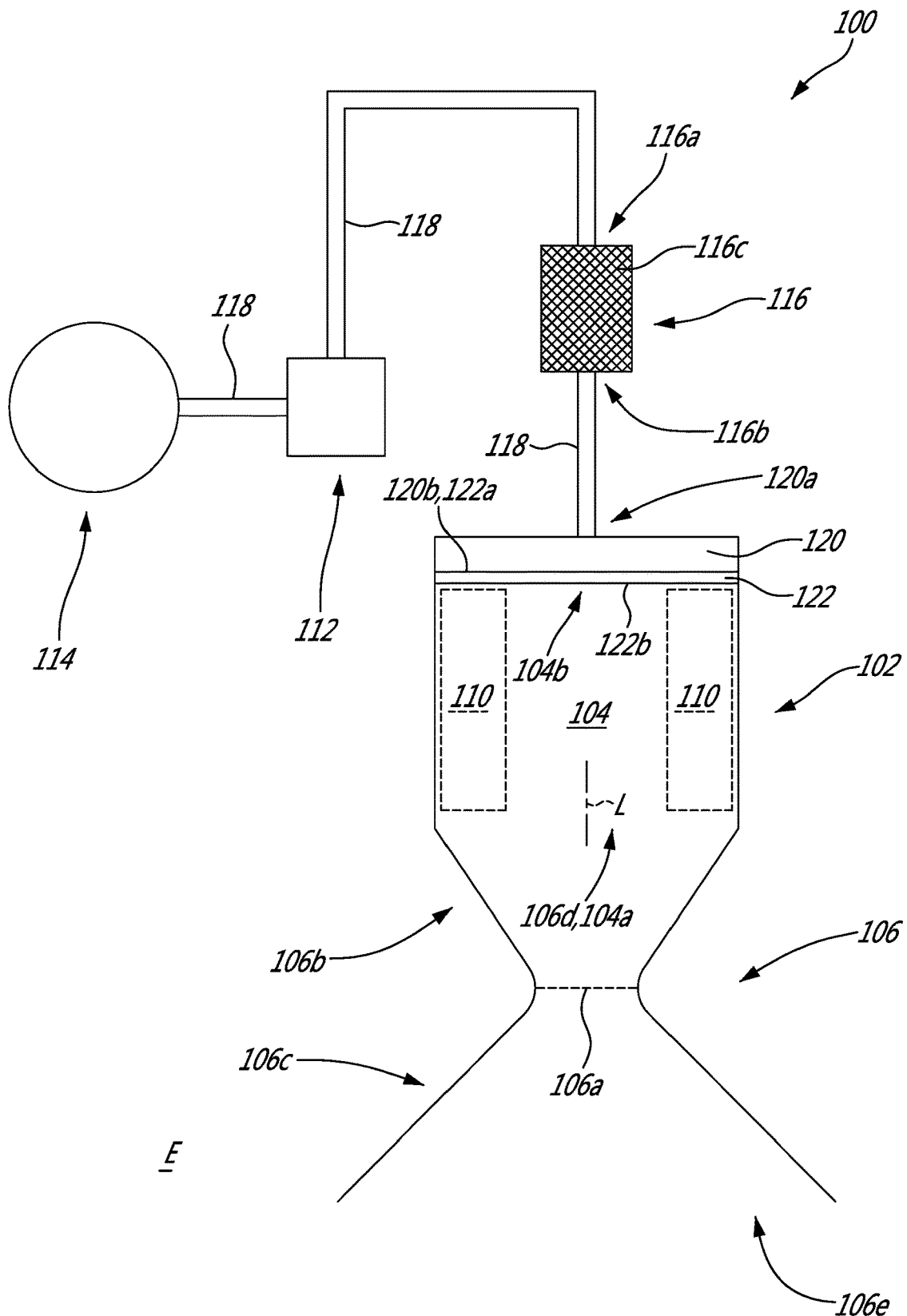
FIG. 1 is a schematic view of a rocket engine system in accordance with one embodiment.

Referring to FIG. 1, a hybrid rocket engine system is shown generally at 100. A hybrid rocket engine combines a solid propellant as fuel and a liquid oxidizer, hence the "hybrid" terminology. The rocket engine system 100 includes a rocket engine 102 defining a combustion chamber 104 and a convergent-divergent nozzle 106 fluidly connected with the combustion chamber 104 and in which combustion gases generated in the combustion chamber 104 may be accelerated from a subsonic speed to a supersonic speed.

The nozzle 106 may define a throat 106a at which a speed of the combustion gases is sonic. The nozzle 106 defines a converging section 106b upstream of the throat 106a and a diverging section 106c downstream of the throat 106a. The nozzle 106 has an inlet 106d fluidly connected to an outlet 104a of the combustion chamber 104 and an outlet 106e in fluid communication with an environment E outside the combustion chamber 104. A cross-sectional area of the nozzle 106 taken on a plane normal to a longitudinal axis L of the rocket engine 102 decreases from the inlet 106d of the nozzle 106 to the throat 106a and increases from the throat 106a to the outlet 106e of the nozzle 106.

The rocket engine system 100 includes an oxidizer reservoir 112 configured to contain the oxidizer. In a particular embodiment, the oxidizer is hydrogen peroxide ($H_2O_2$). The oxidizer may be a solution containing 90% of hydrogen peroxide. Alternatively, the oxidizer may be, for instance, nitrous oxide, gaseous oxygen, liquid oxygen, nitrogen tetroxide, nitric acid. The oxidizer is may be any conventional oxidant used for solid fuel, such as $O_2$, $H_2O_2$, $HNO_3$. Any suitable oxidizer may be used without departing from the scope of the present disclosure. The solid propellant 110 may be, for instance, polyethylene, poly-methyl methacrylate, poly-vinyl chloride, hydroxyl terminated poly-butadiene, paraffin wax. More detail about the solid propellant 110 are presented herein below.

Since the rocket engine system 100 is used in space, gravity may not be sufficient for inducing a flow of the oxidizer in the combustion chamber 104. In the embodiment shown, the rocket engine system 100 has a gas reservoir 114 containing a high-pressure gas, which may be helium. The pressure of the gas contained in the gas reservoir 114 is such that it induces a flow of the oxidizer contained in the oxidizer reservoir 112, from the oxidizer reservoir 112 to an inlet 104b of the combustion chamber 104 of the rocket engine 102.

To allow the oxidizer to chemically react to yield oxygen and another component, the flow of oxidizer exiting the oxidizer reservoir 112 passages through a catalyst 116. In the embodiment shown, the catalyst 116 has an inlet 116a for receiving the oxidizer and an outlet 116b for outputting the catalyzed oxidizer. The inlet 116a of the catalyst 116 is fluidly connected to the oxidizer reservoir 112. The outlet 116b of the catalyst 116 is fluidly connected to the combustion chamber 104. The catalyst may contain a mesh 116c coated with a suitable material, which may be silver. The mesh 116c may be a mesh of SS304 stainless steel. The coating may be made of silver, rare metals, noble metals, ceramics, palladium, ruthenium, manganese oxide, oxides, iron salts, and so on. The material of the coating may maintain its structural and mechanical properties at temperatures of least at 660 degrees Celsius. The mesh 116c may be, for instance, metallic wires with coating, ceramic pellets with catalyst sintered, 3D printed porous matrix with coating.

In the embodiment shown, the oxygen used is obtained from a solution of about 70% of hydrogen peroxide, preferably about 90% and up to 99%, also referred to as HTP. When contacting a material of the catalyst 116, the HTP is catalyzed and converted in gaseous oxygen and superheated water steam (about 660 degrees Celsius). Using catalyzed HTP instead of liquid HTP may offer some advantages: improved combustion efficiency; improved mixing with fuel; and presence of supersonic choke at injector, which may ensure improved combustion stability and decreased pressure oscillations in the combustion chamber 104. Moreover, since the catalyzed HTP is hot, the rocket engine 102 may not need an independent heat source for ignition. In other words, the disclosed rocket engine 102 may be free of an igniter. This may result in a simplified design compared to a configuration having an igniter. Using the catalyzed HTP for igniting the fuel may allow to relight the rocket engine 102 when flying.

The gas reservoir 114, the oxidizer reservoir 112, the catalyst 116, and the rocket engine 102 are fluidly connected with suitable conduits 118. In the embodiment shown, the pressure of the gas contained in the gas reservoir 114 induces a flow of the oxidizer from the oxidizer reservoir 112, the oxidizer passages through the catalyst 116 where it reacts to generate water and oxygen in gaseous phase. The catalyzed HTP is injected in the combustion chamber 104 and ignites the solid propellant and generate combustion gases in the combustion chamber 104. The combustion gases are the accelerated through the nozzle 106 and expelled to the environment E to propel a vehicle equipped with the rocket engine assembly 100.

Still referring to FIG. 1, an injector manifold 120 is provided upstream of the combustion chamber 104 and downstream of the catalyst 116 relative to a flow of the oxidizer within the conduits 118. The injector manifold 120 distributes the oxidizer in a suitable manner within the combustion chamber 104. The injector manifold 120 is preferably watertight as to limit leakage of the oxidizer and/or of the combustion gases. The injector manifold 120 is designed as to be able to withstand mechanical and thermal stresses. An injector plate 122 is located downstream of the injector manifold 120. The injector plate 122 may be provided in the form of a circular plate defining a plurality of apertures therethrough configured to allow passage of the oxidizer exiting the manifold 120. The injector manifold 120 has an inlet 120a fluidly connected to the outlet 116b of the catalyst 116 and an outlet 120b fluidly connected to an inlet 122a of the injector plate 122. The injector plate 122 has an outlet 122b in fluid communication with the combustion chamber 104. Different configurations of the injector manifold 120 and the injector plate 122 are presented herein below.

The injector plate 122 may be annularly shaped and located at the convergent section 106b of the nozzle 106. The injector plate 122 may be located anywhere along the combustion chamber 104 and nozzle 106. In some cases, the injector plate 122 is a circular plate located upstream of the combustion chamber 104 or an annular plate located proximate the nozzle 106. The injector plate 122 is preferably located in such a way as to dispose the injector manifold 120 as close as possible from a location where the injection of the catalyzed HTP is desired, such as close to the propellant, to minimize pressure drops.

Many configurations of the solid propellant 110 within the rocket engine 102 are possible. FIGS. 1a to 6c described below illustrate a plurality of configurations of the solid propellant in the combustion chamber 104 and show how the combustion of the solid propellant alternate the configurations of the solid propellant.

Referring to FIG. 1a, a rocket engine in accordance with one embodiment is generally shown at 10. The rocket engine 10 includes a housing 12 that defines a combustion chamber 14 therein. The housing 12 has a longitudinal axis L. The housing 12 defines an inlet 12a and an outlet 12b of the combustion chamber 14. A flow passage 16 extends from the inlet 12a to the outlet 12b. The inlet 12a is fluidly connected to a source of an oxidizer, which may be an oxidizer tank (not shown) that may be part of the rocket engine 10. The outlet 12b is fluidly connected to, or opens to, an environment E outside the combustion chamber 14 for expelling combustion gases generated within the combustion chamber 14.

The housing 12 of the rocket engine 10 further defines a nozzle 12c axially between the outlet 12b and the combustion chamber 14. In the embodiment shown, the nozzle 12c is a convergent-divergent nozzle and is used to accelerate the combustion gases generated within the combustion chamber 14 to supersonic speeds. The nozzle 12c includes a throat 12d. The throat 12d of the nozzle 12c is where a cross-sectional area of the nozzle 12c taken on a plane normal to the longitudinal axis L is the smallest.

The housing 12 contains a first fuel 18 and a second fuel 20 both contained within the combustion chamber 14. The first fuel 18 has a first solid propellant and the second fuel 20 has a second solid propellant. A regression rate of the first solid propellant is greater than that of the second solid propellant. In a particular embodiment, the first fuel 18 is made of the first solid propellant and the second fuel 20 is made of the second solid propellant. In a particular embodiment, a ratio of the regression rate of the first solid propellant over the regression rate of the second solid propellant ranges from 1.25 to 30. In a particular embodiment, the rocket engine may include more than two fuels differing from each other by their respective regression rate.

Herein, regression rate means a rate at which a solid propellant is consumed. The regression rate may be expressed in length units by time units (e.g., mm/s). The regression rate is also referred to as the burn rate and is the rate at which fuel can be induced to vaporize or ablate off so it can participate in the combustion process and contribute to rocket thrust.

Various possible arrangements of the first and second fuels are possible. A few are described herein below with reference to FIGS. 1a, 2a, 3a, 4a, 5a, and 6a. It is understood that the disclosed arrangements are only a few possibilities and the present disclosure should not be limited by these arrangements. Other arrangements are contemplated.

Still referring to FIG. 1a, the first fuel 18 and the second fuel 20 are axially offset relative to the longitudinal axis L. As shown, the first and second fuels 18, 20 are located upstream of the nozzle 12c relative to a direction of the combustion gases in the flow passage 16. In the embodiment shown, the first fuel 18 includes two annular disks 18a and the second fuel 20 includes three annular disks 20a. An axial thickness of the annular disks 18a of the first fuel 18 taken along the longitudinal axis L is greater than that of the annular disks 20a of the second fuel 20. As shown, the annular disks 18a of the first fuel 18 and the annular disks 20a of the second fuel 20 are disposed in alternation along the longitudinal axis L. Stated otherwise, each of the two annular disks 18a of the first fuel 18 is located between, or sandwiched, between two of the three annular disks 20a of the second fuel 20.

As shown, the flow passage 16 extends through apertures defined through the first and second fuels 18, 20. In the embodiment shown, peripheral surfaces of the apertures defined through the first and second fuels 18, 20 bounds the flow passage 16. This might allow the oxidizer to contact the first and second fuels when it flows from the inlet 12a to the outlet 12b within the flow passage 16.

Referring now to FIGS. 1a to 1c, the regression of the first and second fuels 18, 20 as a function of time is illustrated. As the first solid propellant of the first fuel 18 has a regression rate greater than that of the second solid propellant of the second fuel 20, the first fuel 18 is consumed more rapidly than the second fuel 20. In the embodiment shown, annular pockets 22 are formed following the more rapid consumption of the first fuel 18. The annular pockets are bounded by annular surfaces defined by the annular disks 20a of the second fuel 22. Dimensions of these annular surfaces increase with time. In a particular embodiment, the second fuel 20 acts like a diaphragm and increases efficiency of the combustion, while contributing to the total impulse of the rocket engine 10, as it consumes itself.

Referring to FIGS. 2a to 2c, another embodiment of a rocket engine is generally shown at 200. For the sake of conciseness, only elements that differ from the rocket engine 10 of FIG. 1a are described below.

In the embodiment shown, the first and second fuels 218, 220 are radially offset from each other relative to the longitudinal axis L of the housing 12. In the embodiment shown, the first and second fuels 218, 220 are concentric tubes 218a, 220a; the second fuel 220 being disposed around the first fuel 218. In other words, the first fuel 218 is located radially inwardly to the second fuel 220 relative to the longitudinal axis L.

In the depicted embodiment, an axial length of the second fuel 220 is greater than that of the first fuel 218 such that the second fuel 220 protrudes beyond the first fuel 218 toward the outlet 12b of the combustion chamber 14. A radial thickness relative to the longitudinal axis L of the first and second fuels 218, 220 may be equal before combustion starts.

In a particular embodiment, the second fuel 220 ensures film cooling. Film cooling occurs by insulating the surface to be protected (e.g., the housing 12) from the rapidly flowing hot propellant gases by interposing a thin film of a cooling liquid fuel as it consumes itself along the surface, flowing concurrently with the hot gases, to absorb and carry away all or a portion of the total convective heat flux from the hot gases. In other words, the second fuel 220 is located adjacent the housing 12 and radially between said housing 12 and the first fuel 218. As the second fuel 220 is consumed, it creates a flow of combustion gases in a vicinity of the housing 12. This flow might allow to cool the housing 12.

Referring now to FIGS. 3a to 3c, another embodiment of a rocket engine is generally shown at 300. For the sake of conciseness, only elements that differ from the rocket engine 10 of FIG. 1a are described below.

As for the embodiment of FIG. 1, the first and second fuels 318, 320 are axially offset relative to the axis L. The second fuel 320 is located axially between the first fuel 318 and the outlet 12b of the combustion chamber 14. In other words, the first fuel 318 is upstream of the second fuel 320 relative to a direction of the combustion gases within the flow passage 16.

In the embodiment shown, the first fuel 318 is an annular disk 318a and the second fuel 320 is an annular disk 320a. In the depicted embodiment, dimensions of the annular disks 318a, 320a are the same before the combustion starts.

Referring to FIGS. 1a, 2a, and 3a, as the oxidizer is injected via the inlet 12a of the combustion chamber 14, it contacts the first and second fuels 18, 20, 218, 220, 318, 320 that bound a portion of the flow passage 16. As shown, the portion of the flow passage 16 correspond to peripheral surfaces of aperture defined by the first and second fuels through which the flow passage 16 extends. As it is consumed, diameters of the peripheral surfaces increase thereby increasing a surface contact area between the oxidizer and the first and second fuels. In other words, a dimension of the flow passage 16 increases with time as the first and second fuels are consumed. When the pockets 22 are created, they further increase the surface contact area between the oxidizer and the first and second fuels.

Referring now to FIGS. 4a to 4c, another embodiment of a rocket engine is generally shown at 400. For the sake of conciseness, only elements that differ from the rocket engine 10 of FIG. 3a are described below.

In the embodiment shown, the first fuel 418 is a rod 418a and the second fuel 420 is a tube 420a disposed around the rod 418a. The second fuel 420 is disposed radially outwardly of the first fuel 418. In other words, the first fuel 418 is surrounded by the second fuel 410. In a particular embodiment, the second fuel 420, as it is consumed, ensures film cooling.

The second fuel 420 protrudes axially beyond the first fuel 418 such as to define a pocket 422. The pocket 422 extends radially up to the second fuel 420 and axially up the first fuel 418. As shown more clearly on FIGS. 4b and 4c, an axial depth of the pockets 422 relative to the longitudinal axis L increases as the first fuel 418 is consumed.

In the embodiment shown, the inlet 412a of the combustion chamber is at least one aperture 412a' defined through the housing 412. The at least one aperture 412a' may include a plurality of apertures circumferentially distributed around the longitudinal axis L. The aperture 412a' may be located axially between the first and second fuels 418, 420 and the outlet 412b of the combustion chamber 14. The aperture 412a' may extend solely along a radial direction relative to the longitudinal axis L. Alternatively, the aperture 412a' may extend along both the radial direction and a circumferential direction relative to the longitudinal axis L. The aperture 412a' may induce a swirl to the oxidizer that is injected therethrough.

Referring now to FIGS. 5a to 5c, another embodiment of a rocket engine is generally shown at 500. For the sake of conciseness, only elements that differ from the rocket engine 10 of FIG. 3a are described below.

In the embodiment shown, the first fuel 518 is a first tube 518a. The second fuel 520 includes a rod 520a and a second tube 520b. The rod 520a is located within the first tube 518a and both are located within the second tube 520b. In other words, the first tube 518a of the first fuel 518 is located radially between the rod 520a and the second tube 520b of the second fuel 520.

Thicknesses of the first and second tubes 518a, 520b taken in a radial direction relative to the axis L may be equal or different.

In the embodiment shown, the inlet 512a is at least one aperture 512a' similar to the aperture 412a' described with reference to FIG. 4a.

As shown more clearly on FIGS. 5b and 5c, annular pockets 522 are created by the combustion of the first fuel 518 at a rate greater than that of the second fuel 520. The creation of the annular pockets 522 might allow to increase an area of the first fuel 518 that is in contact with the oxidizer. This might enhance the production of the combustion gases and, hence, of the thrust generated by the engine.

In a particular embodiment, the average mass flow rates of the first and second fuels 18, 20 yields an optimal oxidizer to fuel (O/f) ratio, thus increasing the overall yield of the combustion.

Referring now to FIGS. 6a to 6c, another embodiment of a rocket engine is generally shown at 600. For the sake of conciseness, only elements that differ from the rocket engine 10 of FIG. 3a are described below.

In the embodiment shown, the first fuel 618 includes a rod 618a and a first tube 618b and the second fuel 620 includes a second tube 620a and a third tube 620b. The position of each of those components from radially outward to radially inward relative to the longitudinal axis L is as follows: the second tube 620a of the second fuel 620, the first tube 618b of the first fuel 618, the third tube 620b of the second fuel 620, and the rod 618a of the first fuel 618. Thicknesses of the second and third tubes 620a, 620b of the second fuel 620 may be less than that of the first tube 618b of the first fuel 618.

As the first fuel 618 is consumed at a greater rate than the second fuel 620, a central pocket 622a and an annular pocket 622b are created. The central pocket 620a is separated from the annular pocket 620b by the second tube 618b of the first fuel 618. As aforementioned, those pockets might allow to increase an area of the first fuel 518 that is in contact with the oxidizer. This might enhance the production of the combustion gases and, hence, of the thrust generated by the engine.

Referring to FIGS. 4a, 5a, and 6a, as the oxidizer is injected via the apertures 412a', it contacts the first and second fuels 418, 420, 518, 520, 618, 620 that bound a portion of the flow passage 16. As shown, the portion of the flow passage 16 correspond to end surfaces of the first and second fuels. Depending on the configuration, the end surfaces of the first and second fuels are circular or annular surfaces. As it is consumed, axial lengths relative to the longitudinal axis L of the first and second fuels decrease. A distance taken along the longitudinal axis L between the apertures 412a' and the first and second fuels increases as they get consumed. As the first and second fuels do not get consumed at the same rate, a surface contact area between the first and second fuels and the oxidizer increases. These additional surfaces that become in contact with the oxidizer are created by the formation of the pockets. In other words, the additional surfaces are the surfaces that bound the pockets 422, 522, 622a, 622b that are created by the combustion of the first and second fuels.

In a particular embodiment, such a change of fuel geometry during burn allows a controlled increase of combustion surface, thus modulating thrust curve during flight In a particular embodiment, the first and second fuels 18, 20 have high volumetric specific impulse that might allow a major volume reduction of a tank containing the oxidizer and of the combustion chamber 14. This might increase structural margins of a vehicle equipped with the disclosed engine 10 (which increases stage mass ratio). This increase of stage mass ratio might compensate for the mass losses required for pressure-fed pressurant gas and the size of the pressurant tank.

Compared to solid engines, the disclosed rocket engines might surpass the specific impulse of other existing propulsion systems discussed herein above. The disclosed fuels might be inherently safer to transport and operate. The fuel on its own might be stable and non-toxic and the combustion might only occur when the oxidizer is injected into the combustion chamber.

Overall, hybrid propulsion systems herein disclosed might differentiate themselves from competing liquid engines by being far simpler and cheaper and having a higher volumetric specific impulse. They might differentiate themselves from solid engines by being far safer to produce and handle. And they might differentiate themselves from standard hybrids by having the requisite performance for orbital launch vehicles. The technology might also maintain a high degree of flexibility, meaning that it might be possible for it to be integrated into several alternative launch solutions (air launch, balloon launch, etc.).

Having at least two kinds of solid propellant that differ by the regression rate might allow the ability to yield an optimal oxidizer to fuel ratio during the total duration of the burn thus achieving ideal characteristic velocity. It might further offer the ability to alter the shape of the fuel during the combustion phase, obtaining some cooling characteristics.

For operating the rocket engines, the oxidizer is received within the combustion chamber 14; the first and second fuels are exposed to the received oxidizer; and the combustion gasses created by a reaction between the received oxidizer and the fuels are expelled.

In the embodiment shown in FIGS. 1a, 2a, 3a, receiving the oxidizer includes receiving the oxidizer via an inlet and expelling the combustion gasses includes expelling the combustion gasses via an outlet; the first and second fuels being located axially between the inlet and the outlet relative to a longitudinal axis of the rocket engine.

In the embodiment shown in FIG. 1a, 2a, 3a, receiving the oxidizer includes receiving the oxidizer along an axial direction relative to a longitudinal axis of the rocket engine.

In the embodiments shown in FIGS. 4a, 5a, 6a, receiving the oxidizer includes receiving the oxidizer in a direction having a radial component relative to the longitudinal axis L of the rocket engine. In a particular embodiment, receiving the oxidizer in the direction having the radial component further comprises receiving the oxidiser in the direction further having a circumferential component relative to the longitudinal axis L.

Referring now to FIG. 7, another embodiment of a rocket engine is shown generally at 700. In the embodiment shown, the fuel is a solid propellant 718 in the form of a disk located within the combustion chamber 704 of the engine 700. As shown in FIG. 7A, in an alternate embodiment, the propellant may be a tube defining a central passage 718a.

As shown in FIG. 7, the injector manifold 720 and the injector plate 722 are annular and extends circumferentially relative to the engine longitudinal axis L all around the convergent section 706b of the nozzle 706. The catalyst 716 is annular and located radially between the injector plate 722 and the injector manifold 720.

In the embodiment shown, the catalyst 716 defines an inlet 716a and an outlet 716b. Both of the inlet 716a and the outlet 716b of the catalyst 716 may be annular. In the embodiment shown, the inlet and outlet 716a, 716b of the catalyst correspond to external surfaces of the mesh 716c. One or more of those external surfaces may be in contact with the injector manifold 720 and another one of those surfaces may be in contact with the injector plate 722. The injector plate 722 may define a portion of a wall 706f of the nozzle 706.

In the depicted embodiment, the catalyst 716 is triangular when seen in a cross-section taken on a plane containing the longitudinal axis L of the engine 700. The catalyst 716 may include three annular surfaces; one of the three surfaces may define the outlet 716b of the catalyst 716; another one of the three surfaces may define a portion of the inlet 716a of the catalyst 716 and may be a substantially cylindrical surface; the remaining one of the three surfaces may define a remainder of the inlet 716a of the catalyst 716 and may be have the shape of an annular disk. In other words, the oxidizer may penetrate the catalyst 716 both in an axial direction relative to the longitudinal axis L toward the solid propellant 718 and in a radial direction toward the longitudinal axis L. Other configurations are contemplated.

Referring to FIG. 8, in the embodiment shown, the injector plate 722 defines a plurality of apertures 722a that are circumferentially distributed about the longitudinal axis L. Several shapes for the apertures 722a are considered such as, round, oblong, oval, and so on, or any suitable combinations thereof. Any suitable shape may be used. The apertures may have central axes 722b oriented to inject the catalyzed HTP with a circumferential component relative to the longitudinal axis L. In other words, the apertures 722a of the injector plate 722 may extend from inlets 722c to outlets 722d; the outlets 722d being circumferentially offset form the inlets 722c. Such a configuration may allow to inject the catalyzed HTP with a swirl. Although four apertures 722a are shown, more or less apertures may be used without departing from the scope of the present disclosure. The apertures 722a, further to extend in a circumferential direction relative to the longitudinal axis L, may extend in an axial and/or a radial direction relative to the longitudinal axis L. In a particular embodiment, the apertures are designed such that a flow of the catalyst is chocked at the injector plate. This may improve stability of the combustion and may improve an efficiency of the catalyst.

Referring to FIG. 9, another embodiment of an injector plate, which may be used with the rocket engine 700 described above with reference to FIG. 7, is shown generally at 822. The injector plate 822 defines apertures 822a that are circumferentially distributed all around the longitudinal axis L of the rocket engine 700. Several shapes for the apertures 822a are considered such as, round, oblong, oval, and so on, or any suitable combinations thereof. Any suitable shape may be used. In the embodiment shown, the apertures 822a have central axes 822b oriented axially relative to the longitudinal axis L. In other words, the inlets 822c of the apertures 822 may be radially aligned with the outlets 822d of the apertures relative to the longitudinal axis L of the engine. The inlets and outlets 822c, 822d of the apertures 822a may be circumferentially aligned relative to the longitudinal axis L of the rocket engine. The central axes 822b of the apertures 822a may be parallel to the engine longitudinal axis L. The apertures 822a may extend axially and circumferentially relative to the engine longitudinal axis L and may be free of a radial component. Although two apertures 822a are shown, more or less apertures may be used without departing from the scope of the present disclosure. The apertures 822a may be chamfered or have rounded edges. This may allow for better flow circulation.

It is understood that any combinations of the injector plates 722, 822 described above with reference to FIGS. 7 and 8 are contemplated. For instance, the apertures may extend axially, radially, and/or circumferentially relative to the longitudinal axis L of the engine. As aforementioned, the apertures may have different shapes and may be angled. Any suitable combinations of two or more shapes for the apertures may be used.

Figure 10:
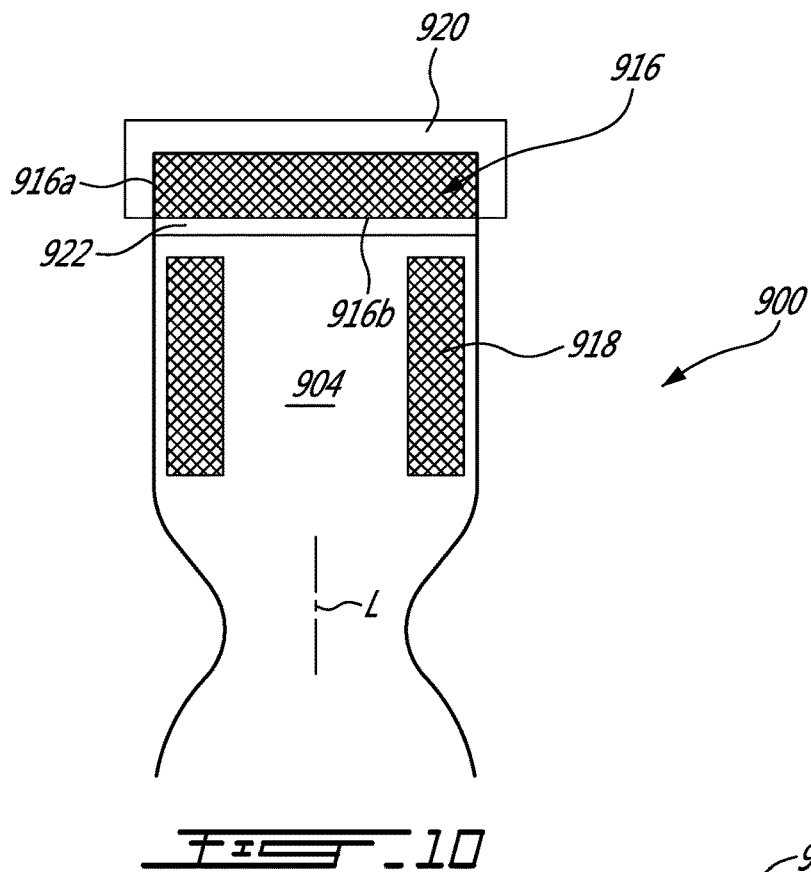
FIG. 10 is a schematic cross-sectional view of a rocket engine in accordance with another embodiment

Referring now to FIG. 10, a rocket engine in accordance with another embodiment is generally shown at 900. The rocket engine 900 includes a solid propellant 918 in the form of a tube located within the combustion chamber 904 of the engine 900. The engine 900 includes a manifold 920, an injector plate 922, and a catalyst 916 between the manifold 920 and the injector plate 922. The oxidizer is injected in the manifold 920, which is configured to distribute the oxidizer all around the catalyst 916. The oxidizer then penetrates the catalyst 916 and is injected in the combustion chamber 914 via the injector plate 922. The outlet of the manifold 920 is fluidly connected to the inlet 916a of the catalyst 916. The outlet 916b of the catalyst 916 is fluidly connected to the combustion chamber 904 via the injector plate 922.

In the embodiment shown, the catalyst 916 contains a mesh in the form of a disk and located at an axial end of the combustion chamber 904. The catalyst 916 has an inlet 916a and an outlet 916b. The inlet and the outlet 916a, 916b of the catalyst 916 correspond to external faces of the disk. For instance, the inlet 916a may correspond to a first circular external face of the disk and to a cylindrical face of the disk whereas the outlet 916b may correspond to a second circular external face of the disk opposed the first circular external face. In other words, and in the embodiment shown, the oxidizer may penetrate the catalyst 916 axially and radially relative to the longitudinal axis L of the engine 900.

The oxidizer is injected in the manifold 920 via an inlet thereof and distributed all around the inlet 916a of the catalyst 916. The oxidizer then passes through the catalyst 916 and exits the catalyst 916 via the outlet 916b thereof, and passes through the apertures of the injection plate 922 before being injected in the combustion chamber 904. In the embodiment shown, the oxidizer is injected substantially axially relative to the longitudinal axis L and within a hollow section defined by the propellant 918.

Figure 11:
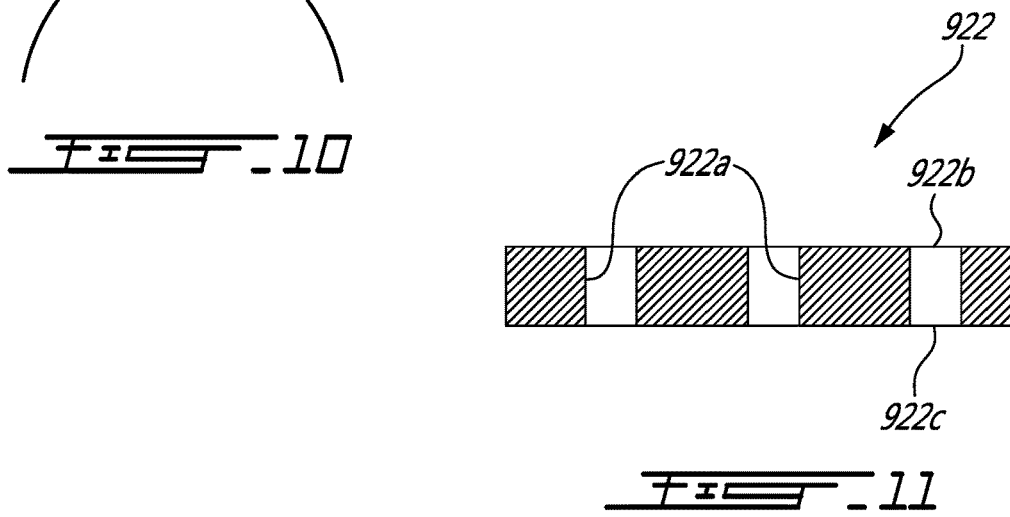
FIG. 11 is a schematic fragmented cross-sectional view, taken on a plane containing a longitudinal axis of the rocket engine of FIG. 10, and illustrating the injector plate used with the rocket engine of FIG. 10.

Referring to FIG. 11, the injector plate 922 is shown on a cross-section taken on a plane containing the longitudinal axis L of the engine 900. As illustrated, the injector plate 922 includes a plurality of apertures 922a. Several shapes for the apertures 922a are considered such as, round, oblong, oval, and so on, or any suitable combinations thereof. Any suitable shape may be used. The apertures 922a fluidly connect the combustion chamber 904 to the manifold 920 and the catalyst 916. In the embodiment shown, the apertures 922a have inlets 922b and outlets 922c that are circumferentially aligned with one another. In other words, and in the depicted embodiment, the apertures 922a extend axially through the injector plate 922 relative to the longitudinal axis L of the engine 900. Stated differently, the apertures may extend parallel to the longitudinal axis L of the engine 900. In such a case, the oxidizer is injected in the combustion chamber 904 in a substantially axial direction relative to the longitudinal axis L.

Figure 12:
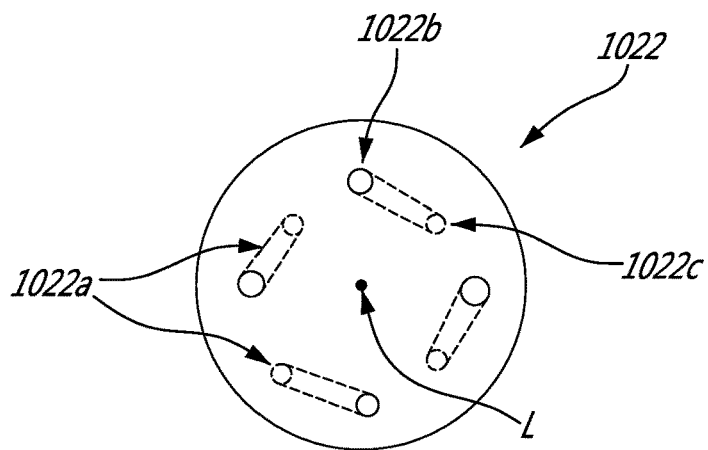
FIG. 12 is a schematic top partially transparent view of an injector plate in accordance with another embodiment that may be used with the rocket engine of FIG. 10.

Referring now to FIG. 12, another embodiment of an injector plate is shown generally at 1022. The injector plate 1022 has a substantially disk shape and defines a plurality of apertures 1022a therethrough. The apertures 1022a have inlets 1022b and outlets 1022c. In the embodiment shown, the inlets 1022b are circumferentially offset from the outlets 1022c relative to the longitudinal axis L of the engine. In such a case, the oxidizer is injected in the combustion chamber in a direction being axial and circumferential relative to the longitudinal axis L. Therefore, the injector plate 1022 may induce a swirl in the oxidizer. Although four apertures are shown, more or less apertures may be used without departing from the scope of the present disclosure. The swirl may allow for a better stability of the flow, a better surface flux, a better regression rate, longer residency time in the combustion chamber, and better combustion efficiency.

Figure 13:
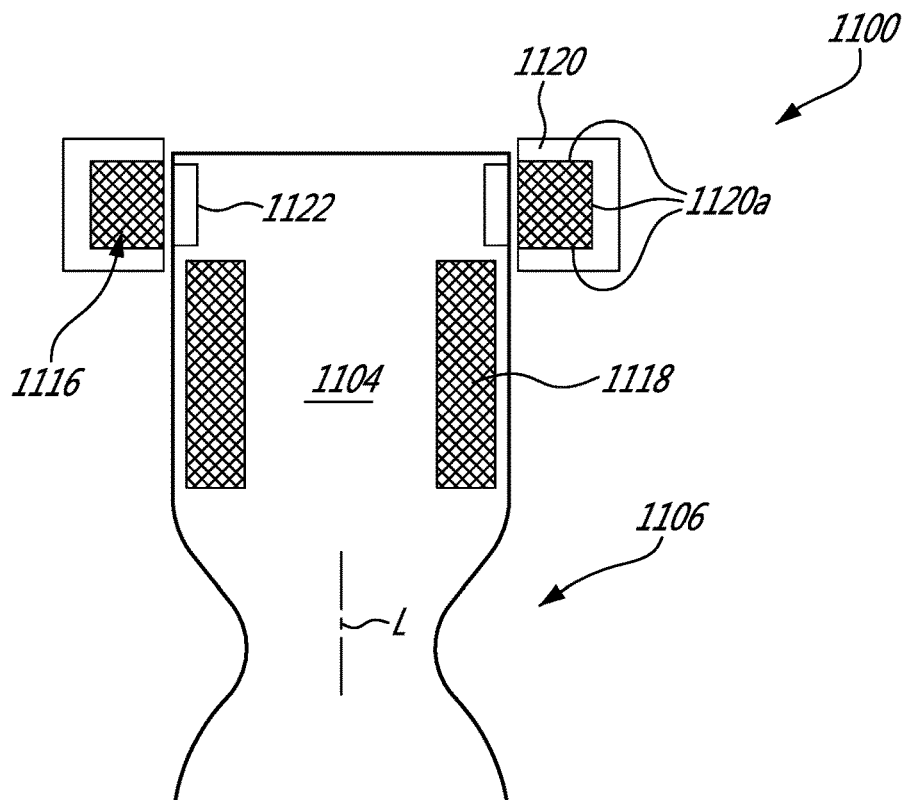
FIG. 13 is a schematic cross-sectional view of a rocket engine in accordance with another embodiment.

Referring now to FIG. 13, another embodiment of a rocket engine is shown generally at 1100. For the sake of conciseness, only elements that differ from the engine 900 described above with reference to FIGS. 10 and 10a are described herein below.

In the embodiment shown, the engine 1100 includes a catalyst 1116 disposed between a manifold 1120 and an injector plate 1122. The catalyst 1116 has an annular shape and extends circumferentially all around the longitudinal axis L of the engine 1110 and around a combustion chamber 1104 thereof. In the embodiment shown, the solid propellant 1118 is located axially between the injector plate 1112 and the nozzle 1106 relative to the longitudinal axis L.

The catalyst 1116 may have a square or rectangular shape when seen in a cross-section taken on a plane containing the longitudinal axis L of the engine 1100. The catalyst 1116 contains a mesh having three external faces defining an inlet of the catalyst, namely two annular faces and one cylindrical face in the embodiment shown, and one face, namely a cylindrical face, defining an outlet of the catalyst.

The manifold 1120 may have a U-shape when seen in cross-section on a plane containing the longitudinal axis L of the engine 1100. The manifold 1120, in the depicted embodiment, is annular and extends all around the longitudinal axis L of the engine 1100. The manifold 1120 is configured to distribute the oxidizer on all of the three faces of the mesh of the catalyst 1116 that define its inlet. In the present case, the manifold 1120 defines three injection faces 1120*a* each being located adjacent a respective one of the three faces of the mesh defining the inlet of the catalyst 1116.

Figure 14:
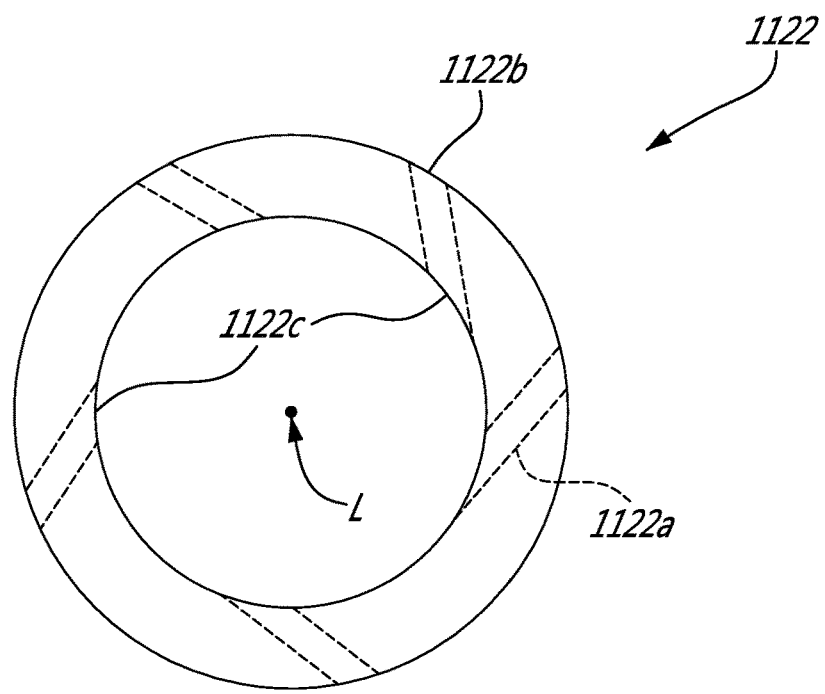
FIG. 14 is a schematic top partially transparent view of an injector plate of the rocket engine of FIG. 13.

Referring to FIG. 14, the injector plate 1122 is illustrated. The injector plate 1122 includes a plurality of apertures 1112*a* circumferentially distributed around the longitudinal axis L of the engine 1100. The apertures 1122*a* have inlets 1122*b* and outlets 1122*c*. The outlets 1112*c* of the apertures 1122*a* of the injector plate 1122 are fluidly connected to the combustion chamber 1104 (FIG. 12). In the embodiment shown, the inlets 1122*b* and the outlets 1122*c* are circumferentially offset from one another relative to the longitudinal axis L of the engine. In such a case, the oxidizer is injected in the combustion chamber 1104 in a direction being radial and circumferential relative to the longitudinal axis L. Therefore, the injector plate 1122 may induce a swirl in the oxidizer. It is understood that the inlets and outlets 1122*b*, 1122*c* of the apertures 1122*a* may be axially offset from one another relative to the longitudinal axis L such that the oxidizer, further to be injected with a circumferential component is injected with an axial component, which may be oriented toward the propellant 1118. Alternatively, the inlets and outlets 1122*b*, 1122*c* of the apertures 1122*a* may be axially aligned relative to the longitudinal axis L.

Figure 15:
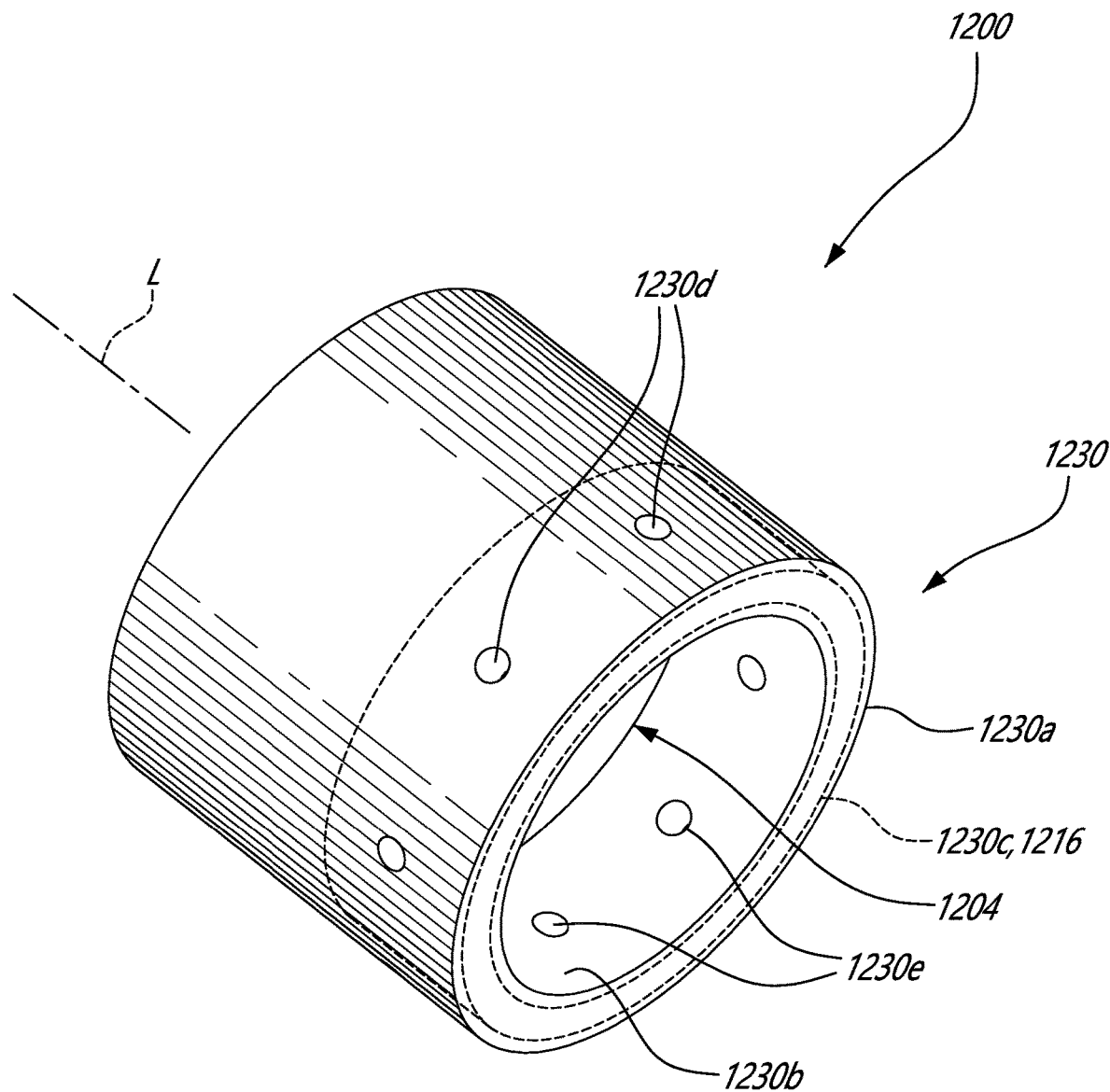
FIG. 15 is a schematic three dimensional view of a portion of a rocket engine in accordance with another embodiment and incorporating an integrated injector assembly.

Referring now to FIG. 15, a section of a rocket engine is shown generally at 1200. The section 1200 may define an upstream end, such as a header, of the rocket engine and a portion of a combustion chamber 1204 thereof. In the embodiment shown, the rocket engine includes an integrated manifold-catalyst-injector plate, referred to herein below has an Integrated Injector Assembly (IIA) 1230.

The IIA 1230 has an external wall 1230*a*, an internal wall 1230*b* located radially inwardly of the external wall 1230*a* relative to the longitudinal axis L, and an annular cavity 1230*c* shown in dashed line and located radially between the external and internal walls 1230*a*, 1230*b*. Both of the external and internal walls 1230*a*, 1230*b* are annular and extend circumferentially around the longitudinal axis L. The IIA 1230 has an inlet defined by a plurality of circumferentially distributed apertures 1230*d*, also referred to as oxidizer inlets or liquid peroxide inlets, extending through the external wall 1230*a* and an outlet defined by a plurality of circumferentially distributed apertures 1230*e*, also referred to as catalyzed injection ports, or catalyzed peroxide injection ports, extending through the internal wall 1230*b* of the IIA 1230.

In the embodiment shown, the catalyst 1216 is located within the annular cavity 1230*c* radially between the external and internal walls 1230*a*, 1230*b*. In the embodiment shown, the annular cavity 1230*c* is dual purpose has it may allow the oxidizer to be circumferentially distributed all around the longitudinal axis L while being catalyzed by the catalyst 1216 since the catalyst 1216 is located inside the annular cavity 1230*c*. In other words, the IIA 1230 performs the function of a manifold, a catalyst, and of an injection plate. In the present case, the injection plate may be considered as the internal wall 1230*b*.

In the embodiment shown, the apertures 1230*e* defined through the internal wall 1230*b* defines exit flow axes C, each having a circumferential component relative to the longitudinal axis L to induce a swirl in the oxidizer as it is injected in the combustion chamber 1204. In other words, the internal wall 1230*b* and the apertures 1230*e* defined therethrough act as a swirl injector. It is understood that other configurations are contemplated. For instance, the apertures 1230*e* may be oriented radially and/or circumferentially or any suitable orientation. For instance, the internal wall 1230*b* and apertures 1230*e* may be coaxial, vortex, doublets, pintle injectors and so on.

There is disclosed herein a catalyst embedded within the injection manifold, all in one part (e.g., the IIA 1230). The IIA 1230 may be manufactured using additive manufacturing. This component, which includes the injector as well, can be integrated anywhere along the combustion chamber. It is understood that other configurations are possible. For instance, the IIA may have a disk shape instead of an annular shape; the catalyst may be located axially between an external wall and an internal wall, which may be provided in the form of disks. Suitable apertures may be defined through the external and internal walls for distributed the oxidizer in the catalyst and for distributing the catalyzed oxidizer in the combustion chamber 1204.

Figure 16:
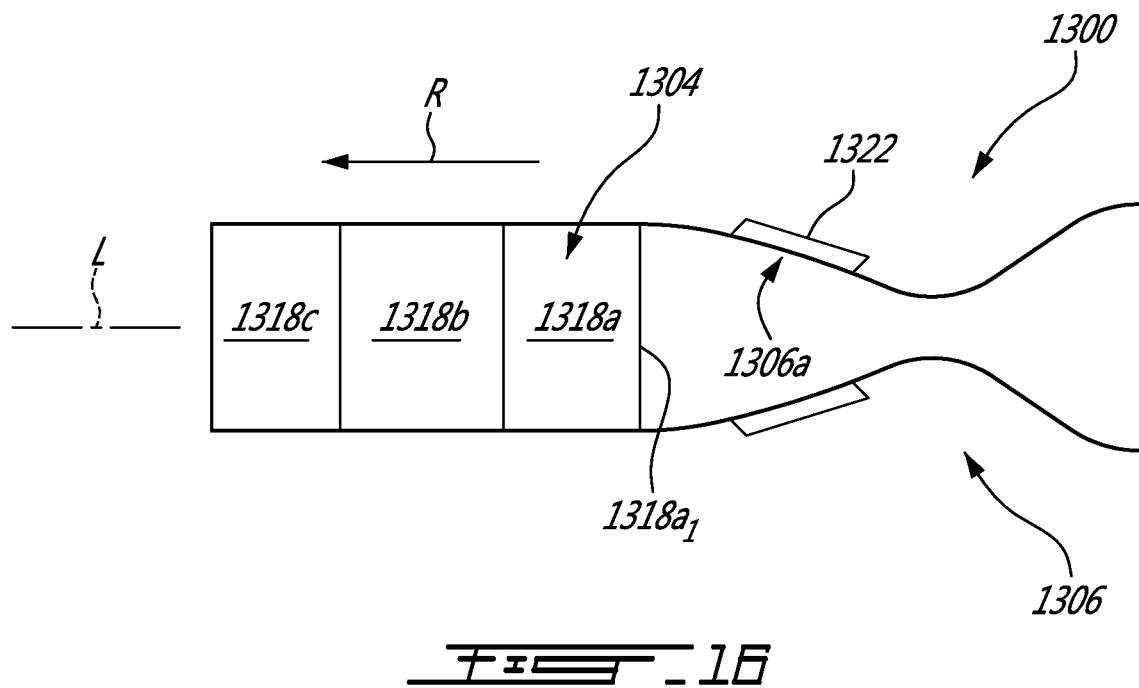
FIG. 16 is a schematic cross-sectional view of a rocket engine in accordance with another embodiment.

Referring now to FIG. 16, a rocket engine in accordance with another embodiment is shown generally at 1300. For the sake of conciseness, only elements that differ from the rocket engine 102 described herein above with reference to FIG. 1 are described herein below. The rocket engine 1300 has a combustion chamber 1304 and a nozzle 1306 in fluid communication with said chamber 1304. In the embodiment shown, the injector plate 1322 is located at the converging section 1306*a* of the nozzle 1306, but other configurations are contemplated. Any configurations described above with reference to FIGS. 7-15 may be used.

Typically, a rocket engine encompassing a single solid propellant, being uniform and homogeneous, will burn very fast initially, then would start to burn slower and slower as the flame front moves along a regression direction. This may be explained by an increase of a volume of the combustion chamber with time as the solid propellant is gradually depleted. Therefore, with time, an increased volume of the combustion chamber may imply a lower concentration of the oxidizer in the combustion chamber, which may yield a lower regression rate. It may be possible to vary a mass flow rate of the oxidizer (e.g. to increase the mass flow rate) as the propellant is depleted to limit a decrease in the concentration of the oxidizer.

Herein, a regression direction is a direction along which the solid propellant is being depleted. In other words, the regression direction represents a direction along which a dimension of the solid propellant decreases during burn. For instance, if the solid propellant is in the form of a tube defining a central passage, the regression direction may be a radial direction as a radial thickness of the tube decreases as the propellant is burned away during the combustion process. In such a case, a dimension of the central passage may increase with time during the combustion process. As another example, if the solid propellant is in the form of a solid cylinder having an axial circular end face exposed to the oxidizer, the regression direction may be an axial direction as a length of the solid propellant decreases during the combustion process. Other configurations are contemplated.

In the embodiment shown, the combustion chamber 1304 contains a plurality of fuels each having a solid propellant. In the embodiment shown, the combustion chamber 1304 contains three fuels, namely a first, a second, and a third fuel 1318*a*, 1318*b*, 1318*b* that are axially stacked one next to the other relative to the longitudinal axis L of the engine 1300. These three fuels 1318*a*, 1318*b*, 1318*c* are, in the present embodiment, cylinders or disks. Each of these three fuels 1318*a*, 1318*b*, 1318*c* is made of a solid propellant differing from that of the others by their regression rates. This may be achieved, for instance, by having the three fuels differing by one or more rheological properties.

The regression direction is illustrated on FIG. 16 by arrow R. The first fuel 1318a has an axial end face $1318a_1$ exposed to the oxidizer being injected in the combustion chamber 1304 by the injector plate 1322. Therefore, during the combustion process, a length taken along the longitudinal axis L of the engine, decreases with time. At some point, the first fuel 1318a is totally consumed and the second fuel 1318b starts to be burned again along the regression direction R. When the length of the second fuel 1318b is zero, meaning that the second fuel 1318b is consumed in entirety, the third fuel 1318c starts to be consumed and its length decreases along the regression direction R until no more fuel remains within the rocket engine.

In the present case, as the fuel stacking burns, the impact of the variation of the oxidizer flux, which may cause the fuel to burn slower over time, may be compensated by the variation of the regression rates of the three fuels 1318a, 1318b, 1318c. In the embodiment shown, the rheological property that is different between the three fuels 1318a, 1318b, 1318c is the viscosity. Varying the viscosity may guarantee a substantially constant fuel mass flow. This constant fuel mass flow may contribute in maintaining a substantially stable oxidizer-to-fuel ratio, which in turn may allow the disclosed rocket engine 1300 to have better performances than a rocket engine having a single solid propellant of uniform viscosity.

It is understood that the three fuels 1318a, 1318b, 1318c may differ by any other rheological properties, alternatively or in combination. Those other properties may be, for instance, the crystallinity of the fuel. Other rheological properties may be, for instance, the density, mechanical properties vs. temperature, fusion temperature, glass transition temperature. It is understood that those rheological properties are considered before the solid propellant enters a reacting phase. In a particular embodiment, an increase of the viscosity implies a decrease in the regression rate. The regression rate may be very sensitive to a variation in the viscosity.

Figure 17:
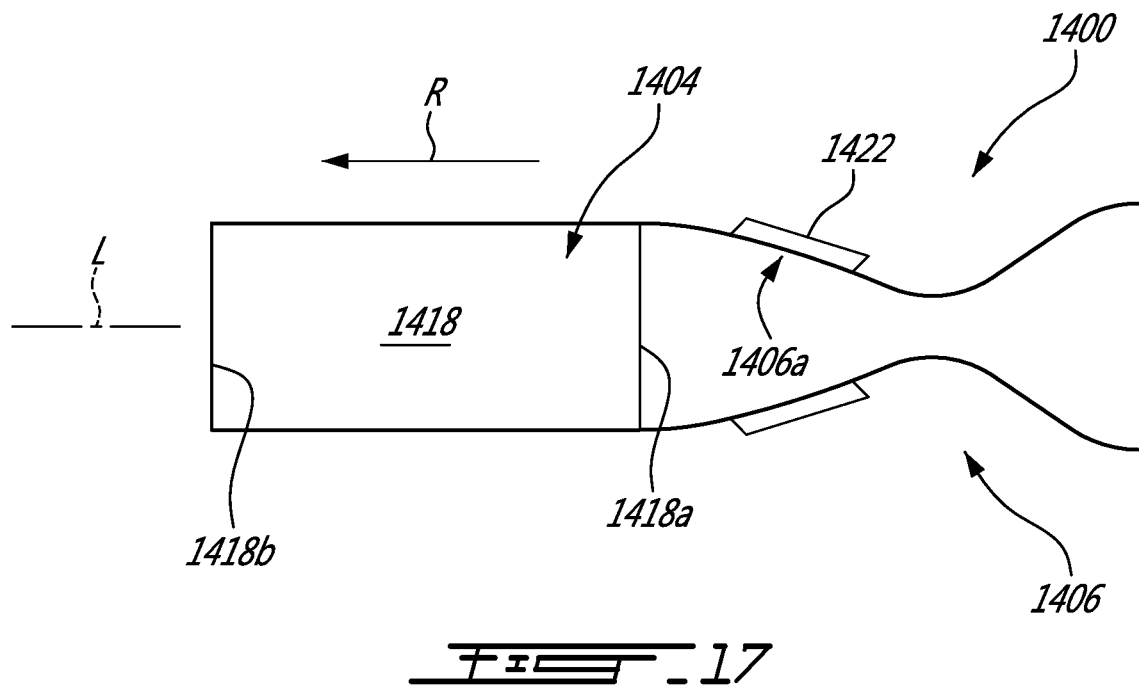
FIG. 17 is a schematic cross-sectional view of a rocket engine in accordance with another embodiment.

Referring now to FIG. 17, a rocket engine in accordance with another embodiment is shown generally at 1400. For the sake of conciseness, only elements that differ from the rocket engine 102 described herein above with reference to FIG. 1 are described herein below. The rocket engine 1400 has a combustion chamber 1404 and a nozzle 1406 in fluid communication with said chamber 1404. In the embodiment shown, the injector plate 1422 is located at the converging section 1406a of the nozzle 1406, but other configurations are contemplated. Any configurations described above with reference to FIGS. 7-15 may be used.

In the embodiment shown, the rocket engine 1400 includes a single solid propellant 1418 that may burn along the regression direction R, which may correspond to an axial direction relative to the longitudinal axis L of the engine. The solid propellant 1418 may define a gradient of a rheological property; the gradient being in the regression direction R. In other words, the solid propellant 1418 may have a rheological property that varies through the propellant along the regression direction R. In the depicted embodiment, the solid propellant 1418 has a viscosity that decreases from a first end 1418a located adjacent the nozzles 1406 to a second end 1418b opposed to the first end 1418a. The first end 1418a is the one exposed to the oxidizer. One or more rheological property(ies) may vary throughout the solid propellant along the regression direction R. The one or more rheological property(ies) may vary monotonically along the regression direction R, linearly, exponentially, or any suitable type of variation may be used.

The solid propellant 1418 may be manufactured using additive manufacturing, and/or modern polymer casting techniques. The solid propellant 1418 may have a rheological property (e.g., the viscosity) that vary in the axial direction relative to the longitudinal axis L and/or in the radial direction. Manufacturing techniques, such as additive manufacturing, and/or modern polymer casting techniques, may allow to cast a single solid fuel, but with a variable viscosity throughout its length (or radius, depending on the fuel's configuration within the combustion chamber). This can be achieved using different methods, namely by varying the thermal curing cycle of the cast over its length (or radius). Another way to yield such a variation of viscosity within the length of the fuel 1418 may be to pre-mold the fuel with a rheological additive incorporated within, as to add less and less of the said additive the more a distance from the nozzle 1406 increases. Rheological additives may be, for instance, metal powders, oxides of metal powders, other miscible substances such as polymers, fibers, or composite types of powders, filler/inert additives. The composite powders may be, for instance, carbon nanotubes, glass fibers, polyamide, etc.

The disclosed rocket engine 1400 having the solid propellant 1418 characterized by a gradient in one or more rheological properties may allow to obtain a substantially constant oxidizer-to-fuel ratio and may allow to obtain a substantially constant mass flow.

Figure 18:
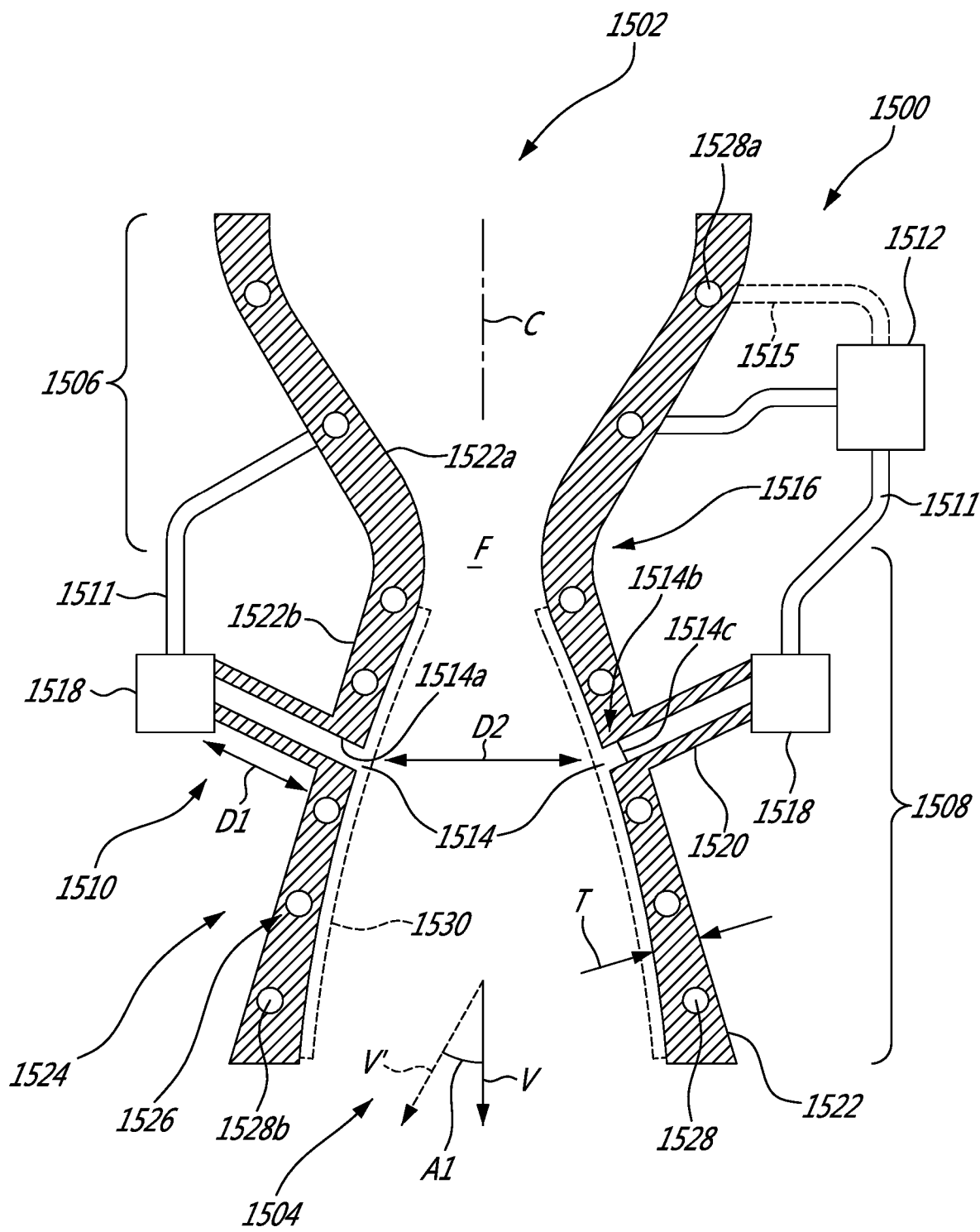
FIG. 18 is a schematic cross-sectional view of a nozzle in accordance with one embodiment that may be used with any of the rocket engines of FIGS. 1-17.

Referring now to FIG. 18, a convergent-divergent nozzle in accordance with another embodiment is shown generally at 1500. The nozzle 1500 may be used in conjunction with any of the rocket engines disclosed above and described with reference to FIGS. 1-17. The nozzle 1500, as discussed above, has an inlet 1502, an outlet 1504, a converging section 1506 and a diverging section 1508.

Typically, means are provided for controlling a direction of a thrust generated by the rocket engine for guiding the rocket. In some cases, a technique known as 'gimballing' is used. In such a technique, one or more actuators, such as hydraulic actuators, are used to pivot the nozzle to change a direction via which the combustion gases are expelled and therefore to change a direction of flight of the rocket. Those hydraulic actuators use hydraulic pumps and lines to supply the actuators with hydraulic fluid. For light-to-medium class launch vehicles, this technique may be overly complex, heavy, and expensive.

Herein, it is proposed to rely on a bypass flow, bled from the main engine, in the form of a gas or liquid, to effect a deflection in a thrust vector V. The concept, broadly known as fluidic thrust vectoring (FTV), may allow developing low-cost space vehicles because it may be substantially free of moving parts; it may be lightweight, and it may offer fast response times. Three distinct classes of FTV exist: shock-vector, counter flow, and throat shift. In the embodiment shown, the nozzle 1500 uses shock-vector control (SVC).

In SVC, a secondary fluid is injected in the diverging section 1508 of the nozzle 1500 where the flow is supersonic. The injected secondary fluid may act as an obstacle that may be "foreseen" by the flow. This may result in a complex shock wave pattern that may create an asymmetric distribution in wall pressure. The wall pressure, when integrated over the nozzle area, may yield a deflection in the thrust vector V' by an angle A1. Two distinct types of injection are possible in nozzle flows: (a) circular injection through an orifice and (b) cylindrical injection through a slot. In some cases, the angle A1 may reach 4 degrees. The bypass flow may be used to cause a deflection in the thrust vector, which may avoid using traditionally heavy hydraulics.

Still referring to FIG. 18, the nozzle 1500 includes a thrust vector control (TVC) device 1510 that may be operatively connected to the divergent section 1508 of the nozzle 1500. The TVC device 1510 may be operable to inject a fluid within a flow passage F of the nozzle 1500. The TVC device 1510 may inject the fluid in an asymmetric manner such as to alter an axisymmetry of the flow pattern within the nozzle 1500 to change a direction of the force vector V.

The fluid that is injected may be contained within a reservoir 1512. The reservoir 1512 may be the oxidizer reservoir for the rocket. In other words, the fluid injected in the divergent section 1508 of the nozzle 1500 may correspond to the oxidizer injected in the combustion chamber of a rocket engine equipped with the disclosed nozzle 1500. The same oxidizer reservoir may feed both of the combustion chamber and the TVC device 1510. Alternatively, the fluid may be contained in a dedicated reservoir. The fluid may be the same as the oxidizer, may be a different fluid than the oxidizer, may be in gaseous or liquid phase. The fluid may be, for instance, HTP, or any other suitable fluid, such as an oxidizer or a fuel.

In the embodiment shown, the fluid is injected in the flow passage of the nozzle 1500 at the divergent section 1508 via at least one aperture 1514. A plurality of apertures 1514 may be used and may be circumferentially distributed around a central axis C of the nozzle 1500. In some cases, only one aperture 1514 may be used, for instance, when a rocket is equipped with more than one rocket engines each having its respective nozzle. Typically, a minimum of three apertures 1514 are used. In some cases, more than 30 apertures are used. Typically, having more apertures may allow for a better granularity in the control of the direction of the thrust vector V. The apertures 1514 may be equidistantly separated from one another. The aperture 1514 may be located at from about 25% to about 70% of a length of the divergent section 1508 along the central axis C from a throat 1516 of the nozzle 1500. The apertures 1514 may be circular or may be slots extending in a circumferential direction relative to the central axis C. The position of the apertures 1514, their number, their dimensions and so on may be optimized as to allow a maximum deviation of the thrust vector V using a minimum volume of the fluid.

In the embodiment shown, the fluid reservoir 1512 is fluidly connected to the apertures 1514 via valves 1518. The valves 1518 may be independently operable from one another to allow injection of the fluid through the apertures 1514 independently from one another for controlling the angle of deflection A1 of the thrust vector V'. Suitable conduits 1511 are used to connect the oxidizer reservoir 1512 to the valves 1518.

Referring to FIG. 15-16, a control system for the TVC 1510 is shown generally at 1600. The control system 1600 includes a processing unit 1602 operatively connected to a computer readable medium 1604. The control system 1600 may be operatively connected to one or more sensors 1606, for instance a gyroscope. The control system 1600 may be operatively connected to the valves 1518 for controlling their opening and closing. The computer readable medium 1604 may have instructions stored thereon to obtain data from the sensor(s) 1606 and to determine a required orientation of the thrust vector V' to orient the rocket in a desired direction. The instructions may, based on the received data from the sensor 1606, calculate how to inject the fluid in the apertures 1514. The control system 1600 may, for instance, determine which of the valves 1518 to open, what mass flow rate of the fluid to inject, a time duration of an injection of the fluid, and so on. The control system 1600 may be able to determine when the rocket is in the desired direction and close the valve to maintain the rocket in said direction. These calculations by the control system 1600 may be made continuously in real time to maintain the rocket in a desired orientation.

Referring back to FIG. 18, in operation, the temperatures of the combustion gases circulating within the flow path F of the nozzle 1500 may be very high and may affect proper operation of the valves 1518. In the depicted embodiment, the valves 1518 are fluidly connected to the apertures 1514 via respective conduits 1520. The conduits 1520 extend at least partially radially away from a wall 1522 of the nozzle 1500 such that the valves 1518 are further away from combustion gases than if the conduits 1520 were not present.

In some cases, the temperature of the combustion gases in the flow path F may be such that it is a challenge to maintain a watertight connection between the conduits 1520 and the apertures 1514. In other words, mechanical connections, such as threads, or other types of connections such as brazing and welding, may fail because of the high temperatures.

In the embodiment shown, at least the divergent section 1508 of the nozzle 1500 has a monolithic body 1524, which may be made of Inconel 718™, Hastalloy™, or any suitable material able to withstand temperatures of the combustion gases. The monolithic body 1524 may define an entirety of the nozzle 1500. A coating 1530, which may be made of a composite material such as an ablative resin, and/or a phenolic resin, may be secured to the inner face 1522*a* of the nozzle 1500. The coating 1530 may include fibers, such as carbon fibers and/or glass fibers. Although the coating 1530 is illustrated as being located solely in the divergent section of the nozzle, it may cover the inner surface of an entirety of the nozzle. The monolithic body 1524 defines the wall 1522 that extends circumferentially around the central axis C, defines the apertures 1514 extending through a thickness T of the wall 1522, and further defines the conduits 1520. The conduits 1502 may protrude monolithically away from the wall 1522. The body 1524, including the wall 1522 and the conduits 1520, may be made of a single block. In other words, the body 1524 may be made of a monolithic piece of material; said monolithic piece defining the wall 1522 and the conduits 1520.

In the embodiment shown, an entirety of the nozzle 1500 is made of the monolithic body 1524. However, it is understood that solely the divergent section 1508 and the conduits 1520 may be made of a monolithic piece of material and be secured to another body corresponding to the convergent section 1506. The throat of the nozzle 1500 may be manufactured with the convergent section 1506 or with the divergent section 1508.

Having the conduits 1520 being monolithic with the wall 1522 may provide for a watertight connection at a junction between the conduits 1520 and the wall 1522. Moreover, having the conduits 1520 being monolithic with the wall 1522 may allow to increase a number of the conduits 1520 without substantially increasing a risk of leakage.

Still referring to FIG. 18, a peripheral surface 1514*a* of the apertures 1514, or an inner surface of the conduit 1520, may be manufactured to define a convergent divergent shape 1514*b* having a throat 1514*c*. This may allow to inject the secondary fluid at a greater speed than if a cylindrical aperture were used. Manufacturing the body 1524 as a monolithic piece may allow to precisely control a shape of the apertures 1514 to create the convergent divergent shape 1514a.

In the embodiment shown, the nozzle 1500 includes a cooling system 1526 that may be used to maintain a temperature of the wall 1522 of the nozzle 1500 within acceptable limits. In the embodiment shown, the cooling system 1526 includes a coolant passage 1528 that extends circumferentially around the central axis C. The coolant passage 1528 is located between inner and outer faces 1522a, 1522b of the wall 1522 of the monolithic body 1524. The coolant passage 1528 may be helicoidally extending around the central axis C. Alternatively, a plurality of coolant passages may extend substantially axially along the central axis C and between the inner and outer surfaces 1522a, 1522b of the divergent section 1508 of the nozzle 1500; manifolds may be fluidly connected to opposed ends of the plurality of conduits.

In the embodiment shown, the coolant passage 1528 is fluidly connected at an inlet 1528a thereof to the oxidizer reservoir 1512 and at an outlet 1528b thereof to the combustion chamber of the rocket engine. A suitable conduit 1515 is used to connect the inlet 1528a to the oxidizer reservoir 1512. The coolant passage 1528 may circulate the oxidizer from the oxidizer tank before the oxidizer is fed to the combustion chamber. A temperature of the oxidizer may increase via its passage within the coolant passage 1528 thereby cooling the wall 1522 of the nozzle 1500. The heated oxidizer may then be injected in the combustion chamber. Alternatively, a dedicated coolant may circulate within the coolant passage 1528. Heating the oxidizer as such may allow to increase an entropy and enthalpy of the oxidizer and may allow to increase a combustion efficiency compared to a configuration in which the oxidizer is not heated. Moreover, heating the oxidizer may allow to avoid using a catalyst since the oxidizer may be catalyzed via its passage in the coolant passage 1528 without the need of a catalyst. The nozzle 1500 may alternatively be manufactured without the cooling system.

The coating 1530 may be made of a material that is configured to be slowly ablated away with time during the combustion process of the solid propellant within the combustion chamber of the rocket engine. A regression rate of the material of the coating 1530 may be substantially less than that of the solid propellant(s) contained within the combustion chamber of the rocket engine. The material of the coating 1530, when exposed to hot combustion gases, may burn and generate a gas that flows in a vicinity of, and parallel to, the inner surface 1522a of the wall 1522 and may allow to film cool the wall 1522 of the nozzle 1500 as the gas is pushed outside of the nozzle 1500 by the combustion gases circulating therethrough.

For manufacturing the divergent section 1508 of the nozzle 1500, the monolithic body 1524 may be manufactured using an additive manufacturing process to define the wall 1522 circumferentially extending about the central axis C and to define the conduits 1520 protruding away from the wall 1522.

The apertures 1514 may be manufactured during the additive manufacturing process. Alternatively, the apertures 1514 may be bored through the wall 1522. Each of the apertures 1514 is concentrically aligned with a respective one of the conduits 1520. The coolant conduit or passage 1528 may be manufactured within the thickness T of the wall 1522 via the additive manufacturing process.

Embodiment disclosed herein includes:

A. A rocket engine comprising: a combustion chamber having a chamber inlet for receiving an oxidizer and a chamber outlet for expelling combustion gases in an environment outside the combustion chamber; a manifold having a manifold inlet fluidly connectable to a source of the oxidizer and a manifold outlet; a catalyst having a catalyst inlet fluidly connected to the manifold outlet and a catalyst outlet; and an injector plate having a injector inlet fluidly connected to the catalyst outlet and an injector outlet fluidly connected to the chamber inlet.

B. An integrated injector assembly for injecting an oxidizer within a combustion chamber of a rocket engine, comprising an inner wall defining an inlet fluidly connectable to a source of an oxidizer, an outer wall spaced apart from the inner wall to define a cavity therebetween, the outer wall defining an outlet for injecting a catalyzed oxidizer within the combustion chamber, and a catalyst located within the cavity.

C. A method of supplying an oxidizer within a combustion chamber of a rocket engine, comprising: receiving an oxidizer; distributing the received oxidizer while catalyzing the received oxidizer; and injecting the catalyzed oxidizer within the combustion chamber.

Embodiments A, B, and C may include any of the following elements, in any combinations:

Element 1: the catalyst is located between the manifold and the injector plate. Element 2: the injector plate includes a plurality of apertures extending therethrough. Element 3: the plurality of apertures are oriented parallel to a longitudinal axis of the rocket engine. Element 4: at least some of the plurality of apertures have aperture inlets being circumferentially offset from aperture outlets relative to a longitudinal axis of the rocket engine for creating a swirl in the oxidizer. Element 5: the catalyst has a mesh, the mesh coated with silver. Element 6: the rocket engine includes a convergent-divergent nozzle located downstream of the combustion chamber, the injector plate, the manifold, and the catalyst being annular and extending circumferentially around a convergent section of the convergent-divergent nozzle. Element 7: the injector plate includes a plurality of apertures extending therethrough. Element 8: the plurality of apertures are oriented parallel to a longitudinal axis of the rocket engine. Element 9: at least some of the plurality of apertures have aperture inlets being circumferentially offset from aperture outlets relative to a longitudinal axis of the rocket engine for creating a swirl in the oxidizer. Element 10: the injector plate is a disk and wherein the catalyst includes a mesh being disk-shaped, the mesh having at least two faces, one of the at least two faces located proximate the injector plate and defining the outlet of the catalyst, the manifold extending over the other of the at least to faces, the other of the at least two faces defining the inlet of the catalyst. Element 11: the injector plate extends circumferentially all around a longitudinal axis of the rocket engine, the catalyst being annular and extending around the injector plate and located radially outwardly of the injector plate relative to a longitudinal axis of the rocket engine, the catalyst having a mesh having at least two faces, one of the at least two faces located proximate the injector plate and defining the outlet of the catalyst, the manifold extending over the other of the at least to faces, the other of the at least two faces defining the inlet of the catalyst. Element 12: the injector plate, the manifold, and the catalyst are located at a convergent section of a convergent-divergent nozzle of the rocket engine. Element 13: the inner wall and the outer wall are annular and circumferentially extend all around a longitudinal axis, the inner wall located radially inwardly of the outer wall, the cavity and the catalyst being annular and extending around the longitudinal axis. Element 14: the inlet includes a plurality of apertures extending through the outer wall and circumferentially distributed around the longitudinal axis. Element 15: the outlet includes a plurality of apertures extending through the inner wall and circumferentially distributed around the longitudinal axis. Element 16: the plurality of apertures have exit flow axes having each a circumferential component relative to the longitudinal axis. Element 17: distributing the received oxidizer includes distributing the received oxidizer within an annular cavity extending all around a longitudinal axis of the rocket engine, and catalyzing the received oxidizer includes circulating the received oxidizer through a mesh extending around the longitudinal axis.

In the present specification including claims, the term "about" means that a value may range from the value minus 10% of the value to the value plus 10% of the value. For instance, a value of about 10 implies that the value ranges from 9 to 11.

The above description is meant to be exemplary only, and one skilled in the art will recognize that changes may be made to the embodiments described without departing from the scope of the invention disclosed. For example, other shapes and arrangements of the fuels within the combustion chamber are contemplated. More than two fuels may be used. Still other modifications which fall within the scope of the present invention will be apparent to those skilled in the art, in light of a review of this disclosure, and such modifications are intended to fall within the appended claims.

The invention claimed is:

1. A rocket engine comprising:
   a combustion chamber having a chamber wall extending around a longitudinal axis, the chamber wall facing the longitudinal axis, the combustion chamber containing a solid fuel, the combustion chamber defining a volume extending axially from an axial end face of the solid fuel to a chamber outlet, the axial end face of the solid fuel being exposed to the volume;
   a nozzle in fluid flow communication with the combustion chamber for expelling combustion gases;
   a manifold being annular and extending circumferentially around the longitudinal axis, the manifold having a manifold inlet fluidly connectable to a source of an oxidizer and a manifold outlet;
   a catalyst being annular and extending circumferentially around the longitudinal axis, the catalyst having a catalyst inlet fluidly connected to the manifold outlet and a catalyst outlet, the catalyst located radially inwardly of the manifold relative to the longitudinal axis; and
   an injector plate located radially inwardly of the catalyst, the injector plate being annular and extending circumferentially around the longitudinal axis, the injector plate having an injector inlet fluidly connected to the catalyst outlet and an injector outlet fluidly connected to the volume of the combustion chamber for injecting a catalyzed oxidizer into the combustion chamber, the injector outlet located radially inwardly of the injector inlet relative to the longitudinal axis, the injector plate facing a direction having a radial component and an axial component relative to the longitudinal axis, the axial component oriented away from a divergent section of the nozzle and towards the axial end face, the injector plate configured to inject the catalyzed oxidizer towards the axial end face such that the solid fuel is ablated along a regression direction extending axially away from the nozzle, the axial end face of the solid fuel spaced apart from the injector plate, the volume located axially between the axial end face of the solid fuel and the injector plate.

2. The rocket engine of claim 1, wherein the catalyst is located between the manifold and the injector plate.

3. The rocket engine of claim 1, wherein the injector plate includes a plurality of apertures extending therethrough.

4. The rocket engine of claim 3, wherein at least some of the plurality of apertures have aperture inlets being circumferentially offset from aperture outlets relative to a longitudinal axis of the rocket engine for creating a swirl in the oxidizer.

5. The rocket engine of claim 1, wherein the catalyst has a mesh, the mesh coated with silver.

6. The rocket engine of claim 1, wherein the injector plate, the manifold, and the catalyst are annular, axially aligned with a convergent section of the nozzle, and extending circumferentially around the convergent section of the nozzle.

7. The rocket engine of claim 6, wherein the injector plate includes a plurality of apertures extending therethrough.

8. The rocket engine of claim 1, wherein the injector plate defines plurality of apertures extending in a direction having an axial component relative to the longitudinal axis of the rocket engine.

9. The rocket engine of claim 8, wherein at least some of the plurality of apertures have aperture inlets being circumferentially offset from aperture outlets relative to the longitudinal axis of the rocket engine for creating a swirl in the oxidizer.

10. The rocket engine of claim 1, wherein the injector plate extends circumferentially all around the longitudinal axis of the rocket engine, the catalyst being annular and extending around the injector plate and located radially outwardly of the injector plate relative to the longitudinal axis of the rocket engine, the catalyst having a mesh having at least two faces, one of the at least two faces located proximate the injector plate and defining the outlet of the catalyst, the manifold extending over the other of the at least two faces, the other of the at least two faces defining the inlet of the catalyst.

11. The rocket engine of claim 10, wherein the injector plate, the manifold, and the catalyst are located at a convergent section of the nozzle of the rocket engine.

12. A method of supplying an oxidizer within a combustion chamber of a rocket engine, comprising:
    receiving an oxidizer;
    distributing the received oxidizer while catalyzing the received oxidizer, the distributing of the received oxidizer includes circumferentially distributing the received oxidizer around a longitudinal axis of the combustion chamber and flowing the received oxidizer towards the longitudinal axis;
    injecting the catalyzed oxidizer within the combustion chamber via a plurality of injection locations circumferentially distributed around the longitudinal axis on an injector plate, the injector plate facing a direction having a radial component and an axial component relative to the longitudinal axis, the axial component oriented away from a divergent section of a nozzle, including injecting the catalyzed oxidizer towards an axial end face of a solid fuel contained in the combustion chamber, the axial end face exposed to a volume located between the axial end face and the nozzle; and
    combusting the solid fuel contained in the combustion chamber with the injected catalyzed oxidizer, including increasing a volume of the combustion chamber while combusting the solid fuel by ablating the solid fuel along a repression direction extending away from the nozzle.

13. The method of claim 12, wherein distributing the received oxidizer includes distributing the received oxidizer within an annular cavity extending all around the longitudinal axis of the rocket engine, and catalyzing the received oxidizer includes circulating the received oxidizer through a mesh extending around the longitudinal axis.

* * * * *